US008914428B2

(12) United States Patent
Rooks et al.

(10) Patent No.: US 8,914,428 B2
(45) Date of Patent: Dec. 16, 2014

(54) SYSTEM AND METHOD FOR MAINTAINING A FILE SYSTEM AT A COMPUTING DEVICE

(71) Applicant: DTTP Technologies Inc., Toronto (CA)

(72) Inventors: Michael Robert Rooks, Burlington (CA); William Garth Hopkins, Toronto (CA)

(73) Assignee: DTTP Technologies Inc., Toronto, Ontario (CA)

( * ) Notice: Subject to any disclaimer, the term of this patent is extended or adjusted under 35 U.S.C. 154(b) by 0 days.

(21) Appl. No.: 14/246,721

(22) Filed: Apr. 7, 2014

(65) Prior Publication Data

US 2014/0304235 A1 Oct. 9, 2014

Related U.S. Application Data

(60) Provisional application No. 61/853,486, filed on Apr. 8, 2013.

(51) Int. Cl.
*G06F 17/30* (2006.01)
(52) U.S. Cl.
CPC .............................. *G06F 17/30073* (2013.01)
USPC .......................................... 707/828; 707/667
(58) Field of Classification Search
None
See application file for complete search history.

(56) References Cited

U.S. PATENT DOCUMENTS

| 6,477,544 | B1 | 11/2002 | Bolosky et al. |
| 7,730,114 | B2 | 6/2010 | Bybee et al. |
| 2005/0004928 | A1* | 1/2005 | Hamer et al. ................. 707/100 |
| 2012/0259809 | A1* | 10/2012 | Hermann et al. ............. 707/600 |

OTHER PUBLICATIONS

Ames Alexander et al. Richer File System Metadata Using Links and Attributes; Proceedings of the 22nd IEEE / 13th NASA Goddard Conference on Mass Storage Systems and Technologies (MSST 2005), Monterey, CA, Apr. 2005.
Ames, Sasha et al. QMDS: A File System Metadata Management Service Supporting a Graph Data Model-based Query Language; Jul. 2011 Sixth IEEE International Conference on Networking, Architecture, and Storage.
Leung et al. Copernicus: A Scalable, High-Performance Semantic File System; Technical Report UCSC-SSRC-09-06; Oct. 2009.

* cited by examiner

*Primary Examiner* — Anteneh Girma
(74) *Attorney, Agent, or Firm* — Perry + Currier Inc.

(57) ABSTRACT

A computing device including a file system in memory is provided. The file system has a plurality of items. Each item can be one of a file or a folder. Where an item is a file, it has a unique content. Where an item is a folder, it is represented by a plurality of container structures. Each container structure references items in the file system through the use of references such as pointers. Each item can be contained by more than one folder by being referenced by more than one folder. Each item can also include a contained-by structure including references to folders containing that item. Moreover, each item can include relationship structures allowing the items to be organized in accordance with relationships other than contained-by relationships, such as content derivation relationships. The file system can be manipulated through the use of various operations such as "Archive" and "Restore" operations.

11 Claims, 18 Drawing Sheets

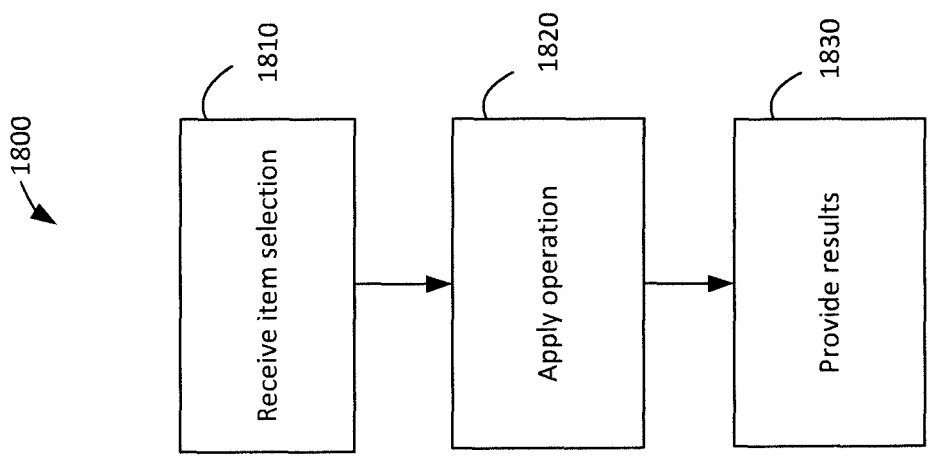

SYSTEM AND METHOD FOR MAINTAINING A FILE SYSTEM AT A COMPUTING DEVICE

RELATED APPLICATIONS

This application claims priority from U.S. patent application 61/853,486, filed Apr. 8, 2013. Priority is claimed to this earlier filed application and the contents of this earlier-filed application are incorporated herein, in their entirety, by reference.

FIELD OF THE INVENTION

The present invention relates generally to maintaining a file system at a computing device. More specifically, the present invention relates to organizing files and other data at a computing device.

BACKGROUND OF THE INVENTION

Computer operating systems use a hierarchical system of folders for storing data items in the form of files, called a file system. Additionally, computer operating systems employ one or more file manager applications for browsing and manipulating a graphical representation of this hierarchical file system.

Existing file systems encourage the duplication of files in multiple folders, to allow users to store and find data in more than one folder. Such file systems, which require a full copy of a file in each folder location, trace their design to the physical filing systems familiar when the first computer file systems were created. While the file and folder metaphor has proven functional, the requirement to create multiple file copies makes the existing computer file system model an expensive, confusing, and impractical solution. Recognition of these costs has led to the implementation of a partial solution in the form of symbolic links (variously referred to as shortcuts, soft links, or aliases) which add to the problem due to their own inherent drawbacks.

SUMMARY OF THE INVENTION

It is an object to provide a novel system and method for maintaining a file system that obviates and mitigates at least one of the above-identified disadvantages of the prior art.

According to an aspect a computing device is provided. The computing device can comprise a processor, and memory operably connected to the processor. The memory can include a file system. The file system can have:
  a plurality of items comprising:
    a plurality of files, each file having unique content;
    a plurality of container structures representing a plurality of folders, at least two container structures including one or more references referencing at least some of the plurality of items other than the at least two container data structures; and
    a first item of the plurality of items being referenced by more than one container structure whereby a single item of the file system can be contained in multiple folders.

The one or more references can comprise at least one of: pointers to memory locations; pointers to location translators; and file system directory paths. The plurality of items can include archived items and active items. The archived item can be an item referenced only by references and folders designated for referencing archived items. Each item can include an associated metadata and an item can be classified as an archived item when indicated by an archive indicator contained by the associated metadata. Each item can include a contained-by structure including references to one or more of the plurality of container structures each item is contained in.

The plurality of files can include relationship files, each relationship file including a content relationship structure having relationship references to other relationship files based on a relationship. The relationship can be a content derivation relationship and the relationship references can indicate one of a derived-by and derived-from relationship between relationship files. Each container structure can be maintained as a file in the file system.

According to another aspect, a method of maintaining a file system on a computing device having a memory and a processor is provided. The method can comprise:
  maintaining in the memory a plurality of items including a plurality of files having unique content and a plurality of folders, each folder represented by a container structure, each container structure including references indicating items contained by the referencing container structure, at least one item being referenced by more than one container structure; and
  performing an operation on the file system.

The operation can be "Refer" for referencing a selected item, selected from one of the plurality of items, by a destination folder selected from one of the plurality of folders and the performing can further comprise:
  adding, to a destination container structure representing the destination folder, a reference to the selected item.

Each item of the plurality of items can include a contained-by structure and the destination container structure can include references to contained items other than the selected item. The method can further comprise:
  identifying additional folders, other than the destination folder, referencing the contained items; and
  providing the additional folders as further folders to add the selected item by applying the "Refer" operation.

The operation can be "Delete" for deleting a selected item selected from one of the plurality of items and the performing can further comprise one of:
  deleting the selected item by:
    removing, from the plurality of container structures, any references to the selected item; and
    removing the selected item from the file system; and
  when the selected item is a folder optionally applying one of:
    when items are left unreferenced by any container structure in the file system as a result of deleting the selected folder, removing the unreferenced items from the file system; and
    performing, on all items referenced by the container structure corresponding to the selected folder, the "Delete" operation.

The method can further comprise:
  when the selected item is a folder, applying the "Delete" operation to items indirectly contained by the selected item.

The plurality of items can include archived items and active items, the operation can be "Archive" for archiving a selected one of the plurality of active items and the performing can further comprise:
  classifying the selected active item as an archived item; and
  when the selected active item is a folder optionally applying one of:
    classifying as archived, all items becoming unreferenced by an active folder as a result of archiving the selected active item; and classifying as archived, all items directly referenced by the selected folder.

The method can further comprise:

when the selected item is a folder, applying the "Archive" operation to items indirectly contained by the selected active item.

The classifying as archived can comprise at least one of:

indicating the selected active item as archived in metadata associated with the item; and removing all references to the selected active item.

The plurality of items can include archived items and active items, the operation can be "Restore" for restoring a selected one of the plurality of archived items and the performing can further comprise:

indicating the selected archived item as active in metadata associated with the item.

The plurality of items can include archived items and active items, the operation can be "Restore" for restoring a selected one of the plurality of archived items, the selected archived item can include a contained-by structure and the performing can further comprise:

restoring the selected archived item as an active item by adding references to the selected archived item based on the contained-by structure of the selected archived item.

The operation can be provision of a context based view of the file system and the performing can further comprise:

receiving an indication of a selected item from the plurality of items; and selectively presenting a portion of the file system in accordance with a context of the selected item wherein the context comprises at least one of:

each of the plurality of folders directly containing the selected item, as identified on the basis of the selected item's contained-by array; and each of the plurality of folders indirectly containing the selected item, as identified on the basis of the selected item's contained-by array.

Each of the plurality of files can include derivation files, each derivation file can have a content derivation structure having derivation relationship references to other derivation files based on a derived-by and derived-from relationship and the operation can be "Delete" for deleting a selected derivation file selected from one of the plurality of derivation files and the performing can further comprise:

deleting the selected derivation file from the file system; and when the selected derivation file is both referenced-by derivation files and references referenced derivation files, linking the references to form derived-by and derived-from relationships with the referenced-by and referenced derivation files.

The operation can be "Populate" for determining the contents of a selected folder selected from one of the plurality of folders and performing can further comprise:

determining the content of the selected folder based on a formula combining one or more of the plurality of items.

The performing can be carried out in response to content changes in the one or more of the plurality of items.

These, together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 18 shows an example method of performing operations on a file system.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Devices or systems may be described herein in terms of block components. It should be appreciated that such block components may be realized by any number of hardware, software, and/or firmware components configured to perform the specified functions. For example, an embodiment of a system or a device may employ various integrated circuit elements, e.g., memory elements, digital signal processing elements, logic elements or the like, which may carry out a variety of functions under the control of one or more microprocessors or other control devices.

Figure 1:
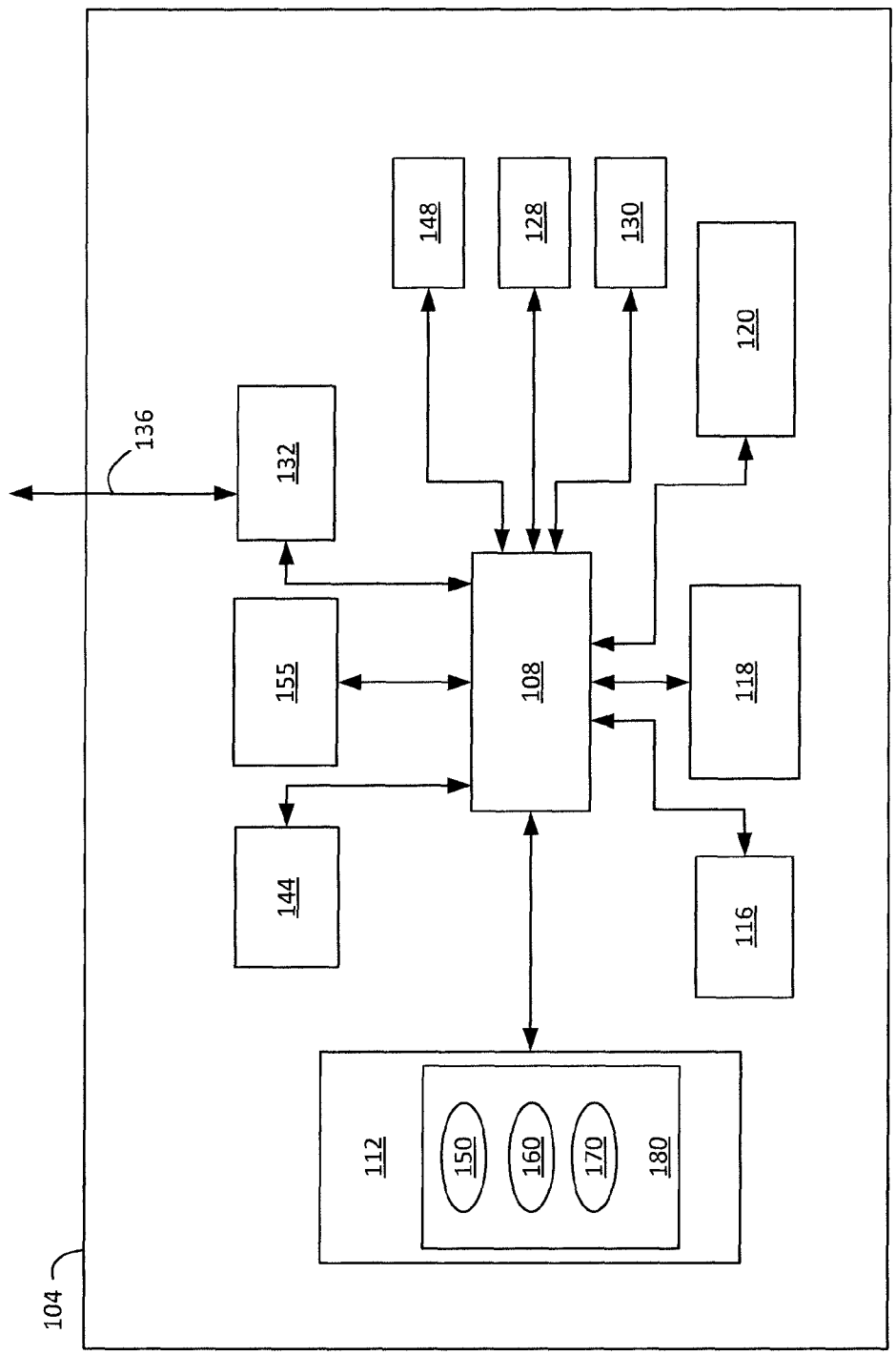
FIG. 1 shows a block diagram of functional subsystems of an example computing device in accordance with an implementation.

FIG. 1 depicts a computing device 104. Computing device 104, in the present example, is based on the computing environment and functionality of a laptop computer. Computing device 104 is not limited to a laptop computer, however. Other devices are also contemplated, such as cellular telephones, smart telephones, Personal Digital Assistants ("PDAs"), media (e.g. MP3) players, tablet computers, digital cameras and the like. In other examples, computing device 104 can be a computing device such as a desktop computer, an embedded computer or other computing device.

Computing device 104 includes at least one main processor 108 that controls the overall operation of the computing device 104. The computing device 104 is interconnected with a non-transitory computer readable storage medium such as a memory 112. Memory 112 can be any suitable combination of volatile (e.g. Random Access Memory ("RAM")) and nonvolatile (e.g. read only memory ("ROM") including Electrically Erasable Programmable Read Only Memory ("EEPROM"), flash memory, magnetic computer storage device, or optical disc memory. In the present example, memory 112 includes both a volatile memory and a non-volatile memory. Other types of non-transitory computer readable storage medium are also contemplated, such as compact discs (CD-ROM, CD-RW), digital video discs (DVD), secure digital (SD) cards and variants thereof.

Computing device 104 also includes one or more input devices interconnected with main processor 108. Such input devices are configured to receive input and provide data representative of such input to processor 108. Input devices can include, for example, a keypad 116 and a pointing device 118. Thus, keypad 116 can receive input in the form of the depression of one or more keys, and can then provide data representative of such input to processor 108. The data provided to processor 108 can be, for example, an American Standard Code for Information Interchange (ASCII) value for each of the depressed keys. Keypad 116 can be a full QWERTY keypad, a reduced QWERTY keypad or any other suitable arrangement of keys. In variations, a keyboard can be implemented as a soft keyboard relying on a touch screen, for example. A pointing device can be implemented as a computer mouse, track ball, track wheel, touchscreen, an active digitizer and corresponding stylus or any suitable combination thereof. In some examples, a computing device can include additional input devices in the form of one or more additional buttons, light sensors, microphones and the like. Pointing device 118 can receive input in the form of movement, pressure or swipe gestures, and can then provide data representative of such input to processor 108 in the form of, for example, coordinates representing the location of a virtual cursor, the direction and/or velocity of a swipe gesture, and the like.

In some examples, computing device 104 can include additional input devices in the form of one or more microphones (144), buttons, light sensors and the like. For example, the communications device 104 can include a camera (148), a fingerprint sensor (not shown), other biometric sensors (not shown), motion sensor (155) and others. In some implementations, one or more of these input devices can provide information that can be used as, for example, passcode substitutes for unlocking the computing device 104. For example, gestures, either on a touchscreen or in the air detected via a camera or other sensors can be used to unlock a device. In other examples, faces or voice recognition can be used to unlock a device. Other sensors and mechanisms for unlocking a device or for providing passcode substitutes will now occur to a person of skill in the art. More generally, any suitable combination of the above-mentioned input devices can be incorporated into computing device 104.

Computing device 104 further includes one or more output devices. The output devices of computing device 104 include a display 120. Display 120 includes display circuitry controllable by processor 108 for generating interfaces which include representations of data and/or applications maintained in memory 112. Display 120 includes a flat panel display comprising any one of, or any suitable combination of, a Liquid Crystal Display (LCD), a plasma display, an Organic Light Emitting Diode (OLED) display, and the like. The display circuitry can thus include any suitable combination of display buffers, transistors, LCD cells, plasma cells, phosphors, LEDs and the like. When the input devices of computing device 104 include a touch screen input device, the touch screen (not shown) can be integrated with display 120.

The output devices of computing device 104 can also include a speaker 128 interconnected with processor 108. Additional output devices are also contemplated including, for example, a light-emitting indicator in the form of a Light-Emitting Diode (LED) 130. In general, computing device 104 can include any suitable combination of the above-mentioned output devices, and may also include other suitable output devices.

Computing device 104 also includes a communications interface 132 interconnected with processor 108. Communications interface 132 allows computing device 104 to perform voice and/or data communications via a link 136, which can be wired and/or wireless, and, where appropriate, with or via a network (not shown). The communication interface 132 receives messages from and sends messages through link 136. Some examples of wireless links 136 include Institute of Electrical and Electronic Engineers (IEEE) 802.11 (Wi-Fi) and Bluetooth™. In some implementations, communications interface 132 can also be configured to allow communications through wired links 136 such as Ethernet and universal serial bus (USB).

Computing device 104 maintains, in memory 112, one or more files containing a plurality of computer readable instructions and/or data. Typically, files are organized in accordance with a structure and logic referred to as a file system. In this illustrative example, file system 180 maintained in memory 112 represents the structure and organization of files accessible by computing device 104.

Files are typically stored in a non-volatile portion of memory 112 such as a solid state disk or a hard drive. In variations, the files can be stored in other portions of memory 112 such as in volatile memory or in a combination of different portions. In yet other variations, some of the files may be stored in memory or storage locations that are external to computing device 104, such as those maintained at network-based cloud storage. The location of files can also vary based on the operational state of the computing device 104. For example, files may be maintained in a non-volatile portion of memory 112 when the computing device is turned off. However, at least some of the files may be moved into a volatile portion of memory 112 as the computer device 104 is powered up, or otherwise rendered operational. In variations, files may be moved to volatile memory as the files are accessed by processor 108. Other combinations of memory 112 portions and operational states for storing files within memory 112 will now occur to a person of skill and are contemplated.

Alone or in combination, one or more files can form an application software or a module. For example, as illustrated in FIG. 1, computing device 104 stores a file manager application 150, a picture management application 160 and an operating system 170. When processor 108 executes instructions contained in the one or more files forming application 150, 160 and/or 170, processor 108 is configured to perform various functions prescribed by the computer readable instructions of the respective applications. It is contemplated that memory 112 can store a variety of additional applications, such as database applications, web browsing applications, and the like (not shown).

Memory 112 can also maintain various files representing information or data that can be utilized by various applications. For example, operating system 170 can utilize a registry data file in carrying out at least some of its functionality, the picture management application 160 can utilize picture files, such as those based on the Joint Photographic Experts Group (JPEG) standard, while performing its functionality.

An operating system such as operating system 170, is a collection of software and/or modules that manages the hardware resources of a computing device. An operating system also provides common services allowing other applications to make use of the hardware resources as appropriate. For example, an operating system can include file system services through which an application such as file manager 150 can access and manipulate the file system supported by the operating system. File system services allow access to basic file management operations by the operating system as well as by applications and modules operating at the computing device 104.

Typically, file system services are provided to help implement a file system in accordance with a specific file system protocol such as the New Technology File System (NTFS). The file system protocol determines the logic and structure according to which files can be organized, the format for naming a file, the format for storing the data and metadata associated with a file, as well as other file system policies that will now occur to a person of skill. In this illustrative example, files are stored in accordance with the file system 180 protocol.

A file system can use folders or containers to organize files maintained in memory 112 (or other storage systems located remotely from device 104). Essentially, a folder or a container is a construct that is able to contain files and other folders, and allows for the hierarchical organization of the file system in the form of graphs. Accordingly, one or more specialized data structures, container data structures, representing folders or containers can be maintained in memory 112. The files (or folders) contained by a container or a folder are not actually integrated into the container data structure. Rather, the files are maintained in memory 112, and the folder includes mechanisms for identifying and accessing contained files in memory.

To illustrate the content of container data structures, they will be discussed in the context of example file system 180. Each container data structure of file system 180 can include an identifier of the folder that the data structure corresponds to. Accordingly, in this example, a container data structure includes a folder name. Specifically, the folder name refers to an identifying indicator for the folder that is made available to applications executed on computing device 104, as well as applications accessing file system 180 through a link 136.

The example container data structure of file system 180 can also store the number of files and the number of folders contained by a particular folder, for example as separate count indicators. The example container can also include an indication of or a reference to the actual items (for example, files and folders) contained in or referenced by the folder. For example, a list of pointers to file locations in memory 112 for each contained item can be maintained in the example container structure. References to items are to be distinguished from symbolic links or equivalents. A symbolic link may not remain valid when the file or folder is moved or deleted, it is a static link to a file or a folder, unlike the references as described herein, which are automatically updated. Additionally, a symbolic link may appear differently or exhibit different behavior from the file or folder it represents. Indeed, one of the advantages of the file system described herein is that symbolic links and their equivalent are no longer required since, in the file system described herein, a file may be included in multiple folders using the system and methods described herein.

Finally, the example container data structure can contain additional metadata which may include various types of data specific to that folder. For example, metadata may include information regarding creating, editing, viewing and sorting and related options. Particulars of the metadata will be described in greater detail below. It should be noted that in some implementations, files other than folders may also have associated metadata. The file metadata may be part of the file itself, or may be maintained in one or more separate locations in memory 112.

The details of the example container data structure for file system 180, as described above, are merely illustrative. In other implementations, the structure and content of the data structure can be different. For example, instead of containing two separate indicators or values for the number of files and the number of folders contained, a single value representing all items contained by a folder can be maintained. In such a variation, the type of the item contained, namely whether it is a folder or a regular file containing data or instructions can be determined on the basis of other data such as the list of items contained. For example, the list of items contained may indicate the type of item being pointed to or the type may be determined on the basis of the item itself once the item is accessed. In other implementations, pointers may also include an item size to enable proper delineation of the file in memory 112. Alternatively, the item size may be part of the file itself and may be determined upon accessing the item. In yet further variations, file and folder names associated with the files and folders contained can also be stored in the container structure, although in other variations, the file and folder names can be obtained from the files and folders themselves. Other variations for the container data structure will now occur to a person of skill and are contemplated.

In some variations, one or more specialized files, referred to herein as folder files, can be used to store the container data structures. For example, each container data structure may be contained by one folder file. In such variations, the folder name can be the same as the file name for the folder file storing the container structure. In other variations, more than one container data structure may be included in a file folder. In yet other variations, each container structure may be contained in various groupings comprising one or more files. These and other variations which will now occur to a person of skill are contemplated. In this illustrative example, it will be assumed that for file system 180, each container data structure for a folder is stored in a folder file of its own, and hence container data structures will be treated as synonymous with folder files or folders for short. It should be emphasized that this arrangement is chosen for illustrative purposes only, and as-described above, other arrangements are possible and are contemplated.

The folders can be maintained in a non-volatile portion of memory as files and loaded into a volatile portion such as random access memory (RAM) for convenience and execution speed. The transfer or loading to a volatile portion of memory 112 can occur, for example, while the computing device 104 is booting, powered up or otherwise rendered operational. In variations, the transfer can occur during the operational state of the computing device 104. For example, the transfer may occur when a file is accessed, providing a means of caching the folder. The loading process could also involve translating the container structure from one storage format to another, the formats being chosen for example on the basis of their suitability to the type of memory portion currently maintaining the container structures or the type of operations contemplated at a given operational state of device 104. In other variations, the structures can be maintained in and accessed from non-volatile memory only. Other combinations of memory 112 portions and operational states for storing folders within memory 112 will now occur to a person of skill and are contemplated.

Files (including folders) stored within memory 112, in this example file system 180, can typically be maintained and organized by a user of computing device 104 via the execution of the file manager application 150 by processor 108. A file manager application is typically configured to operate in conjunction with the operating system and the file system services. In this example, file manager application 150 works in conjunction with the operating system 170. In variations, a file management application can be part of an operating system, such as one of its provided modules.

File manager application 150 provides programmatic, command and/or graphical based interface or interfaces for accessing file system services of operating system 180. Through these interfaces, users and/or other applications can manipulate the file system 180, performing multiple operations such as creating or deleting files.

Figure 2:
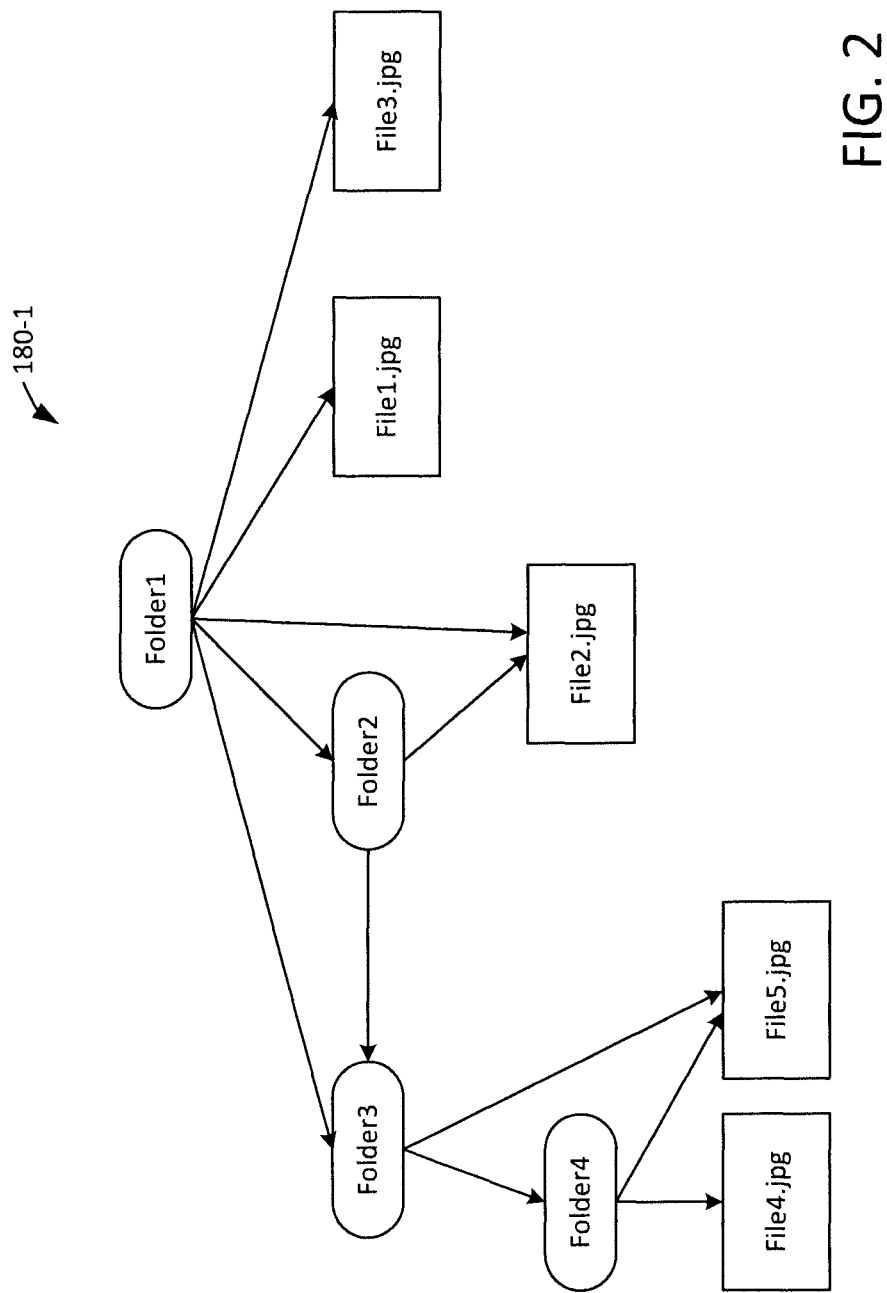
FIG. 2 shows a block diagram of an example file system organization in accordance with an implementation.

Continuing with the illustrative implementation and referring to FIG. 2, an example file organization for a portion of files and folders contained in an illustrative file system maintained by operating system 170 is shown at 180-1. File system 180-1 corresponds to file system 180 of FIG. 1, except that the files forming the operating system 170 and applications 150 and 160 have been omitted to simplify the illustrative example. In FIG. 2, folders are shown as ovals and files are shown as rectangles. The arrows indicate files and folders contained by a folder. For example, in this exemplary file organization, folder Folder1 is designated as the root folder and contains three files (File1.jpg, File2.jpg and File3.jpg) and two folders (Folder2 and Folder3).

Figure 3:
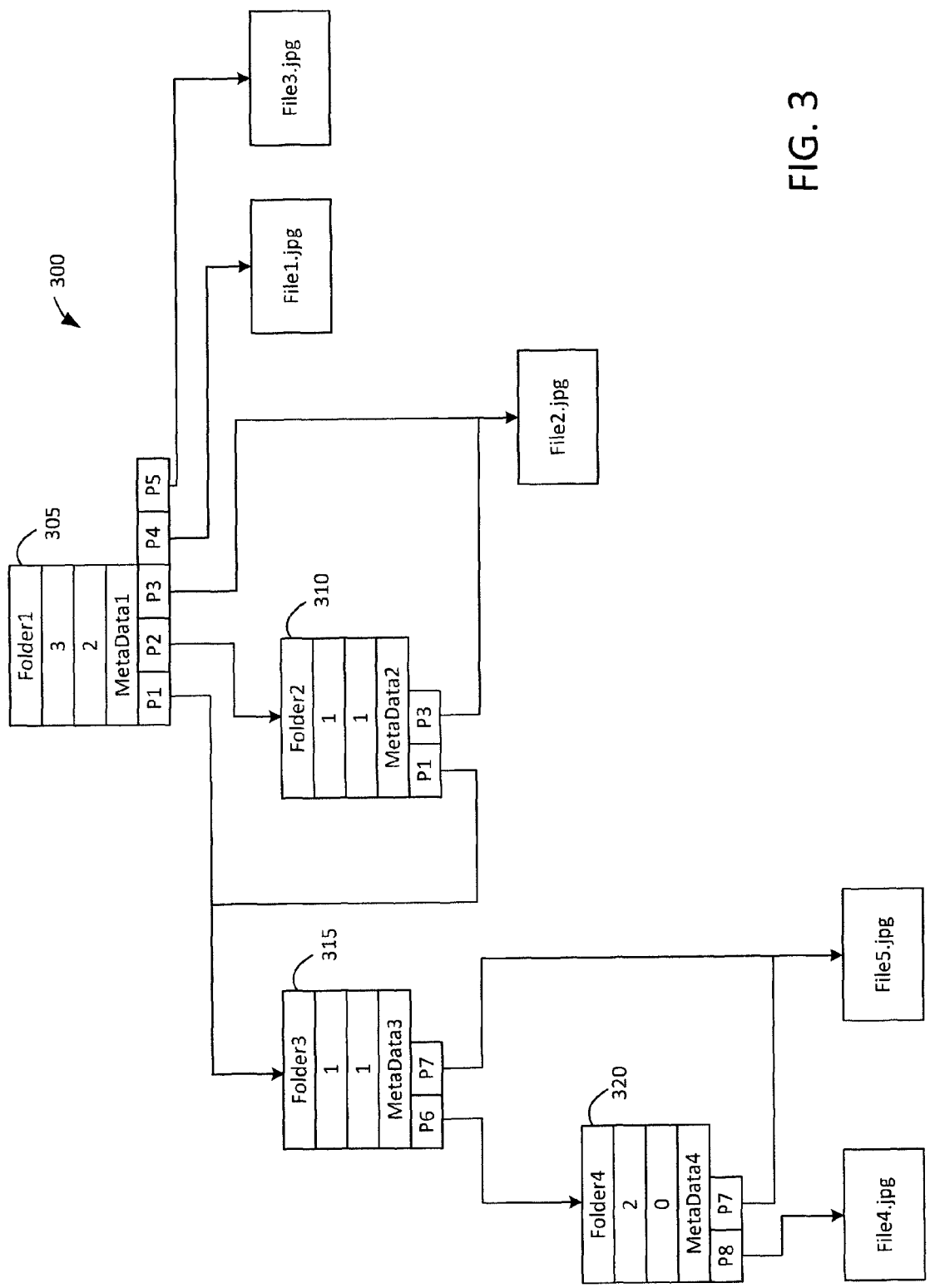
FIG. 3 shows a block diagram of an example file system organization including structures representing folders in accordance with an implementation.

Referring now to FIG. 3, the contents of the exemplary container structure for each folder included in the illustrative file system 180-1 are indicated at 300. The files are shown as rectangles as with FIG. 2. It should be noted however that, although not shown, files may include some additional metadata in addition to the actual file content related to the management of file system 180-1. Referring to 305, the contents of the container data structure for the folder named Folder1 are indicated. Accordingly, based on rows 2 and 3 of the container data structure 305, folder Folder1 contains three files and two folders, a total of five items. Row 5 shows that the list of items contained can be found at memory 112 locations indicated by pointers P1, P2, P3, P4 and P5. Finally, row 4 contains metadata MetaData1 associated with Folder1.

Continuing with FIG. 3, the contents of the exemplary container for the folder named Folder2 are indicated at 310. Accordingly, based on rows 2 and 3 of the container data structure 310, folder Folder2 contains one folder and one file. Row 5 of container structure 310 indicates that the list of items contained can be found at file locations indicated by pointers P1 and P3. Finally, row 4 contains metadata MetaData2.

Continuing with FIG. 3, the contents of the exemplary container for the folder named Folder3 are indicated at 315. Accordingly, based on rows 2 and 3 of the container data structure 315, folder Folder3 contains one file and one folder. Row 5 of container structure 315 indicates that the list of items contained can be found at file locations indicated by pointers P6 and P7. Finally, row 5 contains metadata MetaData3.

Continuing with FIG. 3, the contents of the exemplary container for the folder named Folder4 are indicated at 320. Accordingly, based on rows 2 and 3 of the container data structure 320, folder Folder4 contains two files and no folders. Row 5 of container structure 320 indicates that the list of items contained can be found at file locations indicated by pointers P8 and P7. Finally, row 5 contains metadata MetaData4.

Although, in this example implementation, container data structures have been shown in a particular manner, they can be implemented using a variety of structures or constructs including linked lists, arrays, structures, object oriented containers or relational or flat databases, amongst others. Moreover, they may be stored in fewer or more structures or files organized in a different manner. Additionally, it is assumed that each container structure is contained in a single folder file, and thus pointers in the container structures point to memory 112 locations for those folder files. In variations, however, container structures can be contained in different formats and combinations; the references such as the pointers to contained folders can be adjusted to reflect these variations. For example, in variations, all of the container structures can be maintained in a single data structure in memory 112, and the pointers to folders could be pointers to relevant portions of that data structure.

Operating systems typically provide file system services for performing operations on the file system. In this illustrative example, operating system 170 provides file system services for performing operations for managing and organizing files and folders of file system 180 in accordance with file system 180 protocol. These operations include, for example, "Create", "Import", "Refer", "Unrefer", "Delete", "Purge", "Archive" and "Restore" operations that can be applied to files and/or folders. Each of these operations can cause creation and/or updating of one or more container data structures to reflect the operation's effects. Moreover, each of these functions is described in greater detail below. In some variations, combinations of these operations can be used to form combined operations which are presented through a user interface. For example, a "Move" operation may be formed from a combination of "Unrefer" and "Refer" operations.

The "Create" operation involves creating within the file system 180 and/or importing to the file system 180 one or more files or folders. In effect, the "Create" operation causes one or more new files and/or folders to be included in the file system 180. To create items, several actions are performed. One or more files and/or folders are created in memory 112 and the created file's content is appropriately populated, including associated container structures if the created item is a folder. The metadata for the created files or folders is also appropriately updated. To import items, one or more files or folders are brought into the file system 180 from another file system. The appropriate content structure and metadata are added to the imported items. Creation or importing of an item allows the formation of an instance of that item in memory 112 (or a remote location if the file system includes memory locations external to computing device 104). However, the created or imported items, in some variations, may not be referenced by any folders in the file system 180. Thus, created or imported items can be unreferenced items and can be archived as appropriate as described below. In other variations, created or imported items may also be included in one or more existing folders through the "Refer" operation. The "Refer" operation is described below in greater detail.

Figure 4:
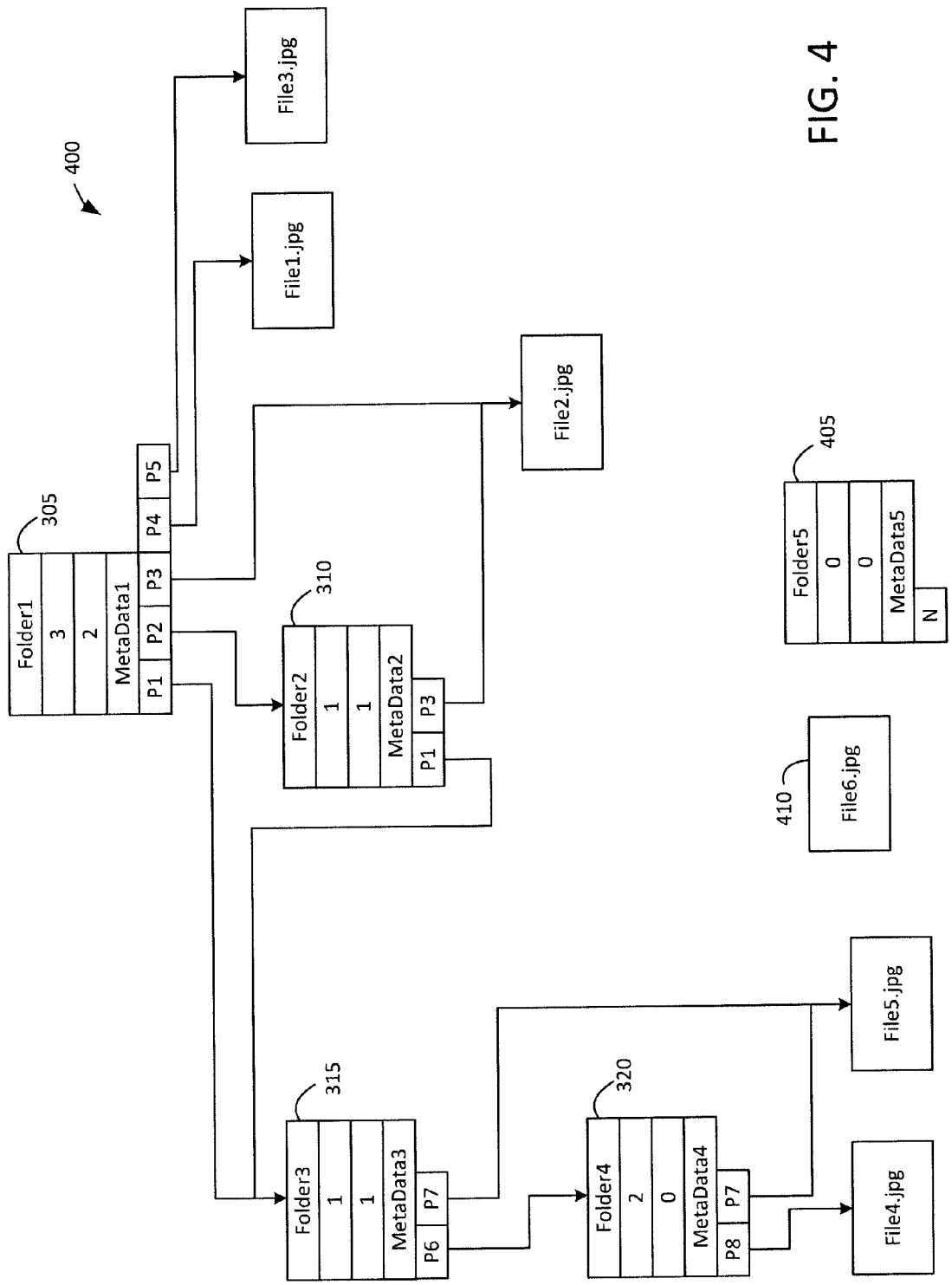
FIG. 4 shows a block diagram of an example file system organization including structures representing folders in accordance with an implementation.

Referring now to FIG. 4, an illustrative example of creating a folder, Folder5 and a file, File6.jpg, in file system 180-1 of FIG. 2 is shown at 400. Container structure 405 for folder Folder5 has been created and populated in memory 112 as a folder file. Accordingly, folder Folder5 contains no files and no folders, and thus includes a null pointer in row 5 to indicate that there is nothing to point to. The metadata Metadata5 may also be updated accordingly, so as to indicate a creation time and date for the folder. A file for file File6.jpg is also created in memory 112 as indicated at 410. The metadata of file File6.jpg (not shown) may also be updated to reflect creation related information. It should be noted that, at this point there are no references or pointers to the created items since they have not yet been archived or referenced by any folders.

Typically, files are created by an application that can read and/or write that file type. For example, the picture manager application 160 can be used to create a picture file such as File1.jpg. Applications can also be used to create folders. On the other hand, typically folders are created or items are imported through the use of an application that allows access to file system operations such as file manager 150.

In some implementations, prior to performing an operation, preliminary validity checks may be performed to help ensure that the file system protocols are being adhered to. In variations, validity checks can be performed as part of any or some of the file system operations available. For example, in this example implementation, "Create" or "Import" operations can be accompanied with a validity check to ensure created or imported files are not duplicates of items already in the file system. In some implementations, folders may be duplicated even when file duplication is not allowed. In variations, where the item to be created or imported is also added to an existing folder, and that item is a duplicate, the duplicate item already existing in the file system is added to the folder through the " " operation instead of creating a new instance of the item. Other validity checks will now occur to a person of skill and are contemplated.

It should be noted that in variations where the created or imported folders and files involve a hierarchy (when being imported for example), content of the container structure or structures created can be appropriately varied to reflect the hierarchy. Moreover, in further variations, the created items may also be added to one or more folders. The "Refer" operation is described next.

Figure 5:
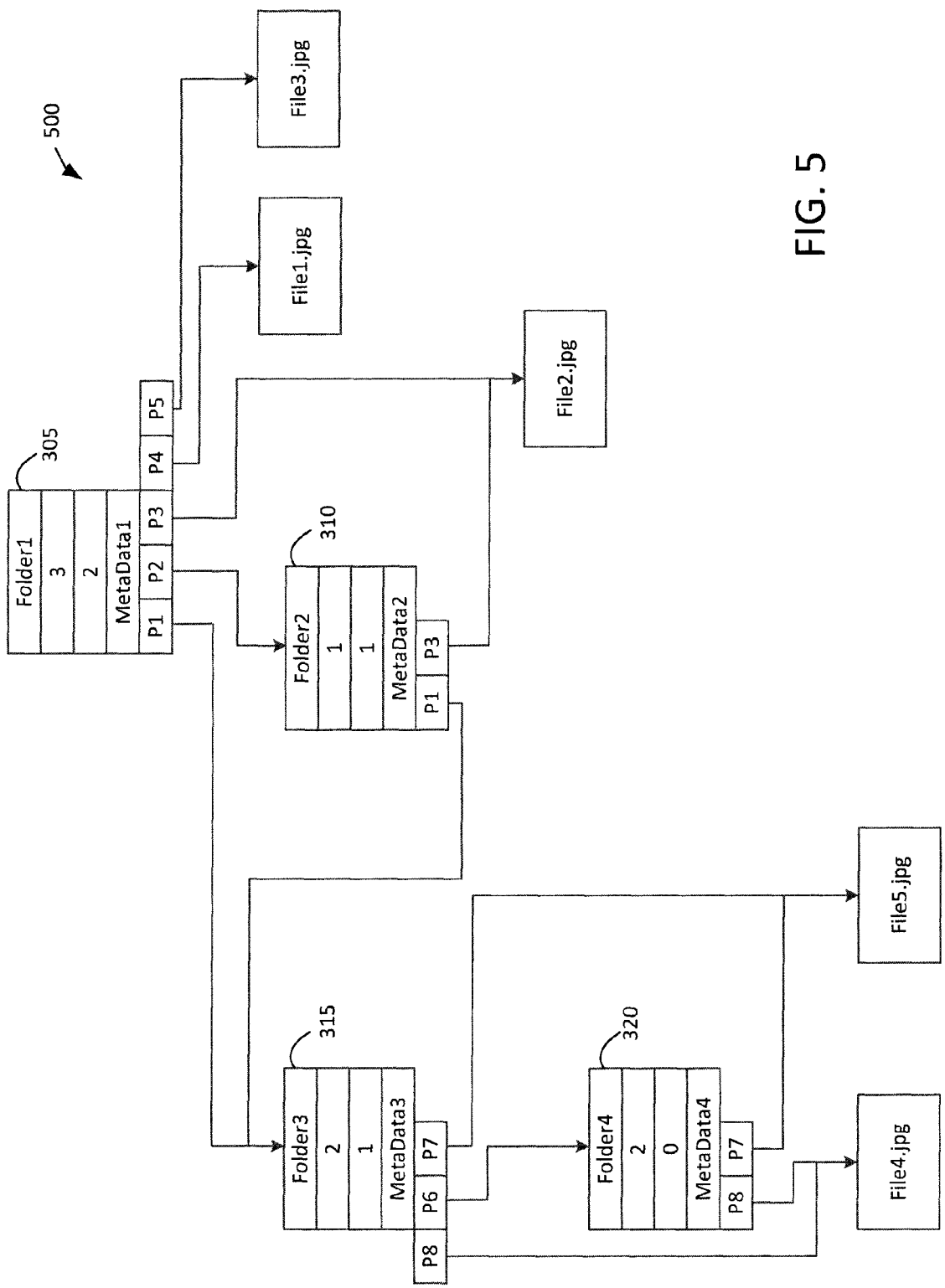
FIG. 5 shows a block diagram of an example file system organization including structures representing folders in accordance with an implementation.

Continuing with example operations that can be performed by the illustrative file system services, performing a "Refer" operation involves referencing an existing item by an existing folder so as to indicate that the item is contained by that folder. Referring now to FIG. 5, the result of referencing an item from a folder of file system 180-1 of FIG. 2 is shown at 500 where file File4.jpg is now referenced by folder Folder3 . Accordingly, container data structure 315 is updated such that rows 2 and 3 now indicate that folder Folder3 contains two files and one folder respectively. Moreover, an additional pointer, P8 has been added to Row 5 to point to the Memory 112 location of file File4.jpg. It should be noted that when a "Refer" operation is performed, the item referenced by a folder is not actually modified in memory 112, by for example duplication of the item in memory 112. Rather, a reference to that item's location in memory 112 is added to the containing folder. Accordingly, only one instance of each item is maintained in memory 112, even though that item may be referenced by multiple folders. This has significant advantages, such as eliminating duplication, and accordingly, avoiding pitfalls that arise where file duplication is allowed. For example, where file duplication is disallowed, the complexities necessary for tracking multiple copies of a file can be reduced or eliminated. This can provide significant advantages such as reducing storage requirements, and reducing the chance of creating unreferenced files. Moreover, files are not deemed to be 'located' in any one folder or a combination of folders. The instance of a file is located independently of the folder hierarchy. Additionally, searching or traversing the file system maintained in accordance with the description herein is rendered more resource-efficient since multiple copies of files need not be traversed or searched. Backing up the file system is also rendered more efficient due to above mentioned advantages.

In some variations, validity checks may be performed prior to performing a "Refer" operation to help ensure that the file system protocols are being adhered to. For example, checks may be performed to ensure that referring to a folder by another folder does not result in a circular reference. For example, trying to contain folder Folder1 by folder Folder4 would result in a circular reference where folder Folder1 contains folder Folder3 , folder Folder3 contains folder Folder4 and folder Folder4 contains folder Folder1 . Such an operation may thus be prevented in some implementations. Moreover, additional validity checks may be performed to detect and prevent operations defined as invalid for a file system, such as trying to contain a folder by itself. In variations, validity checks can be performed as part of any or some of the file system operations available. Other validity checks will now occur to a person of skill and are contemplated.

Figure 6:
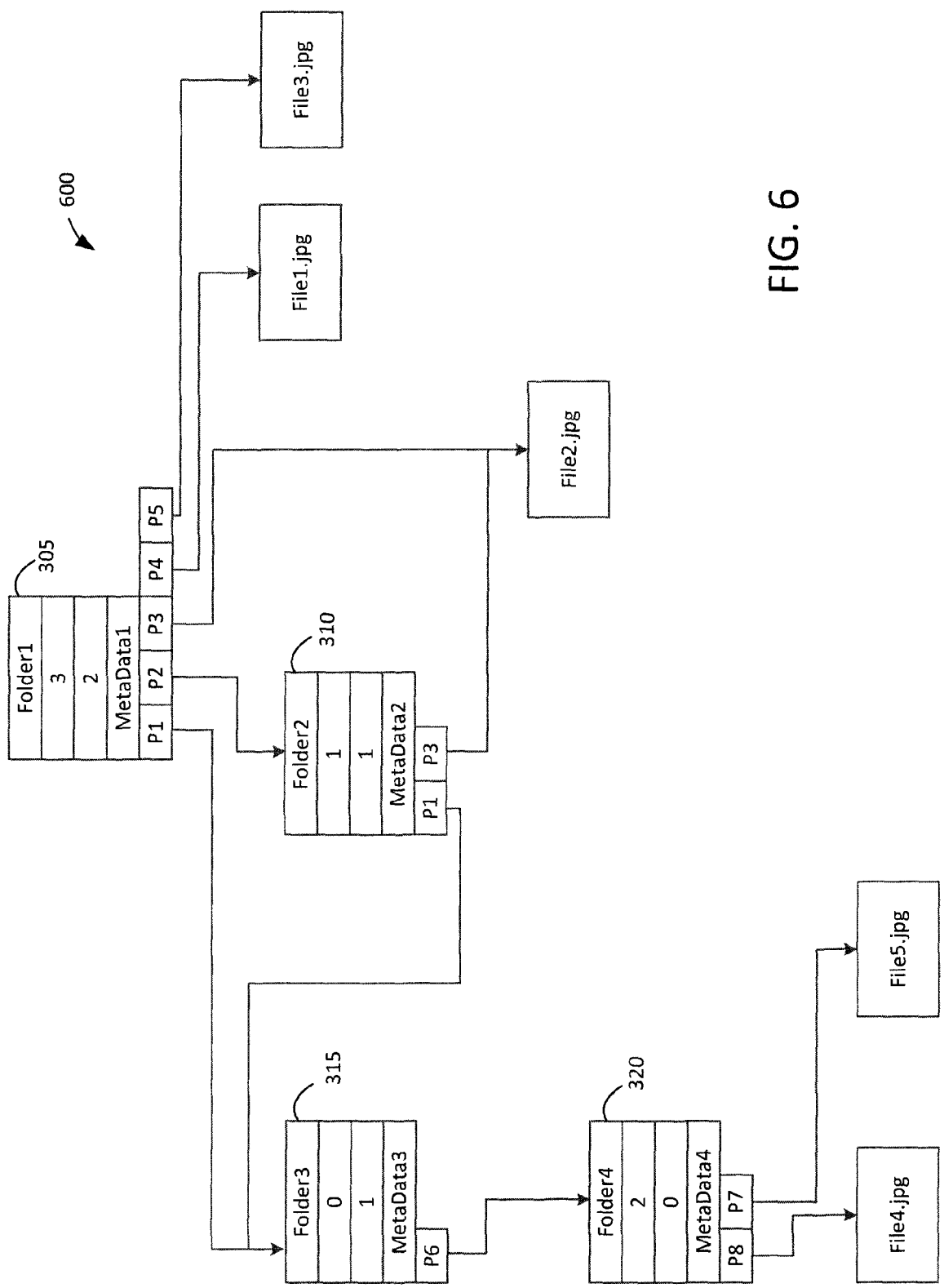
FIG. 6 shows a block diagram of an example file system organization including structures representing folders in accordance with an implementation.

The "Unrefer" operation is a further file system 180 operation that results in dereferencing of an item from a folder directly containing that item. Dereferenced items are not removed from memory 112. Instead it is the pointers to the dereferenced item that are removed from the appropriate container data structures, thus ensuring that the item is no longer contained in folders corresponding to those container structures. For example, referring to FIG. 6, the result of dereferencing file File5.jpg from folder Folder3 of file system 180-1 of FIG. 2 is shown at 600. Container data structure 315 is updated to reflect the decremented file counter indicated at row 2 to zero—indicating that folder Folder3 does not contain any files—and the file pointer P7 for file File5.jpg is removed. It should be noted that where the result of the dereferencing is such that the item dereferenced is no longer contained in any folders, namely where the file or folder dereferenced becomes unreferenced, the dereferenced item could be archived as described below.

Figure 7:
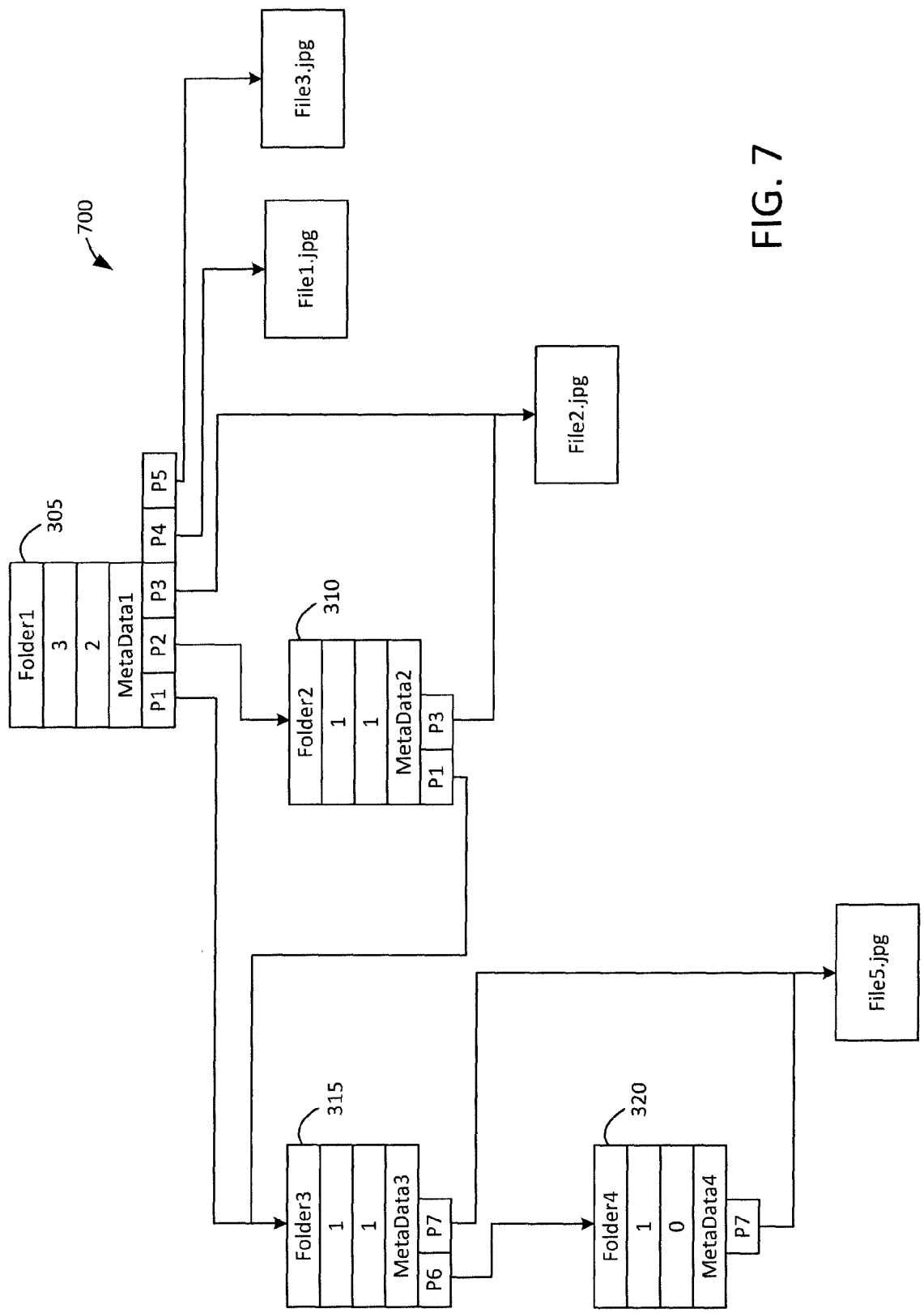
FIG. 7 shows a block diagram of an example file system organization including structures representing folders in accordance with an implementation.

Continuing with file system operations, performing a "Delete" operation on an item results in the item being permanently deleted from the file system 180. Referring to FIG. 7, the result of deleting a file, file File4.jpg from file system 180-1 of FIG. 2 is shown at 700. Based on the "Delete" operation, file File4.jpg is deleted from memory 112. Moreover, container structure 320 is updated by removing the pointer P8 and decrementing the contained number of files, indicated at row 2, to 1. In variations where the deleted item is contained by multiple folders, all of the container structures associated with the containing folders can be updated in a similar manner.

Where the deleted item is a folder, additional complexities may need to be addressed and thus several delete rules may be used. For example, in accordance with a first delete rule, only the folder selected is deleted. Accordingly, the container data structure for that folder is deleted from memory 112. Moreover, container structures for folders containing the deleted folder are updated as with the dereferencing of a folder through the "Unrefer" operation. In cases where the deleted folder contains items, these contained items can become unreferenced if not referenced by any other folders in the file system. The unreferenced items can be archived as described below. In situations where the deleted folder is the root folder, all other items may be dereferenced and archived in the manner described below.

Figure 8:
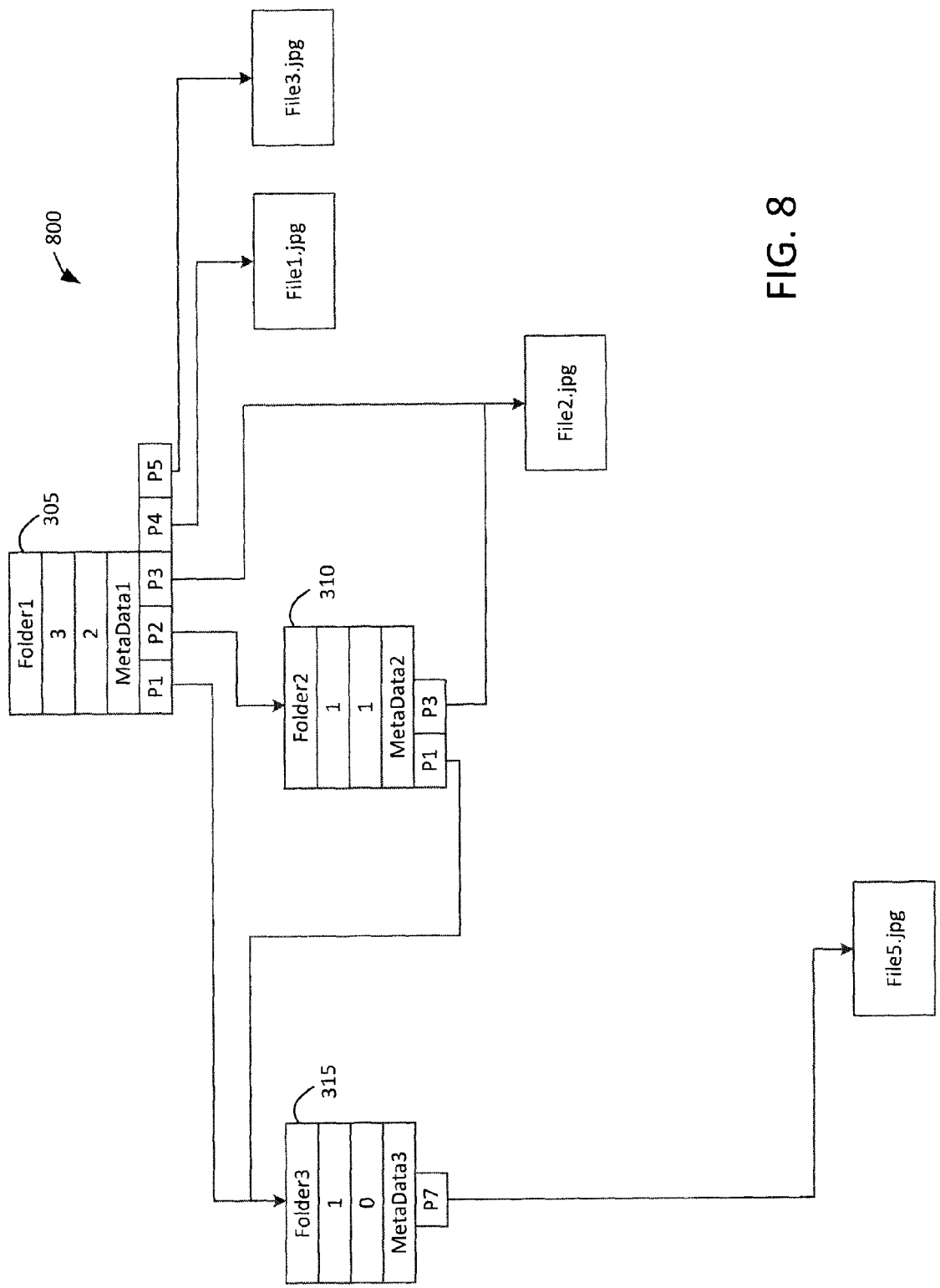
FIG. 8 shows a block diagram of an example file system organization including structures representing folders in accordance with an implementation.

Referring to FIG. 8, the result of completing a "Delete" operation for deleting a folder, Folder4, from file system 180-1 of FIG. 2 is shown at 800 in accordance with a second delete rule. According to the second delete rule, deleting a folder deletes the folder, and any items unreferenced as a result of deleting the folder. In this example, deleting folder Folder4 results in the dereferencing of file File4.jpg. File File4.jpg thus becomes unreferenced, and is also deleted in accordance with the rule. However, items still contained by other folders, such as file File5.jpg which is contained by folder Folder3, remain in the file system 180-1. In variations, the unreferenced items, such as file File4.jpg in this example, could be archived as described below instead of being deleted.

In accordance with a third delete rule, deleting a folder, Folder4 of file system 180-1 of FIG. 2 for example, can result in all items directly contained by the folder, in this example file File4.jpg and file File5.jpg, to also be deleted. An item is directly contained by a folder if the folder includes a reference or a pointer to that item. In a variation, directly contained items could be archived instead of being deleted. Furthermore, any items that become unreferenced as a result of performing the "Delete" operation in accordance with the third delete rule can be archived in the manner described below.

In variations, the first, second or third delete rule can be also applied to folders contained by the folder being deleted. This process can be repeated. For example, the first delete rule can be applied to all folders reachable from the initially deleted folder. Alternatively, the rule can be applied to a specified portion of the hierarchy, such as to a predetermined number or portion of folders, contained (directly or indirectly) by the deleted folder. An item is indirectly contained by a folder if there is a path of folders from the folder to the item. For example, folder Folder4 of FIG. 2 is indirectly contained by folder Folder1 since there is a path of folders (Folder1 -Folder3 -Folder4) from Folder1 to Folder4.

As a further alternative, the rule can be applied to folders contained by the deleted folder that are a predetermined number of levels below the deleted folder in the hierarchy. For example, referring to FIG. 2, deleting folder Folder2 from the file system 180-1 in accordance with the second delete rule, the rule can be applied to all of the folders contained directly or indirectly by folder Folder2. Referring to FIG. 2, the second delete rule would first be applied to folder Folder2 resulting in Folder2 being deleted. Then the second delete rule would be applied to the folders contained by Folder2, in this case folder Folder3. Accordingly, folder Folder3, and folder Folder4 would be deleted (folder Folder4 would become unreferenced as a result of deleting folder Folder3, and hence would also be deleted). Next the second delete rule would be applied to folder Folder4 (prior to completing the deletion of that folder, for example), since it is indirectly contained by folder Folder2. Accordingly, files File4 and File5 would also be deleted since they are now unreferenced. Thus, applying the second delete rule to folder Folder2 and its directly and indirectly contained folders would result in the deletion of folders Folder2, Folder3 and Folder4 as well as files File4.jpg and File5.jpg. In all of these variations, container data structures would be updated as appropriate to reflect the changes to the file system. Other variations of applying delete rules to a folder and its contents will now occur to a person of skill and are contemplated. For example, in some variations, only the files or the folders may be deleted in accordance with the above rules. It should be noted that maintaining only one instance of a file makes deleting files much more efficient in comparison with the case where duplicates are allowed and are located in multiple locations. In this case, deleting a file simply involves deleting one instance and removing several references, as opposed to having to track and delete duplicates.

Figure 9:
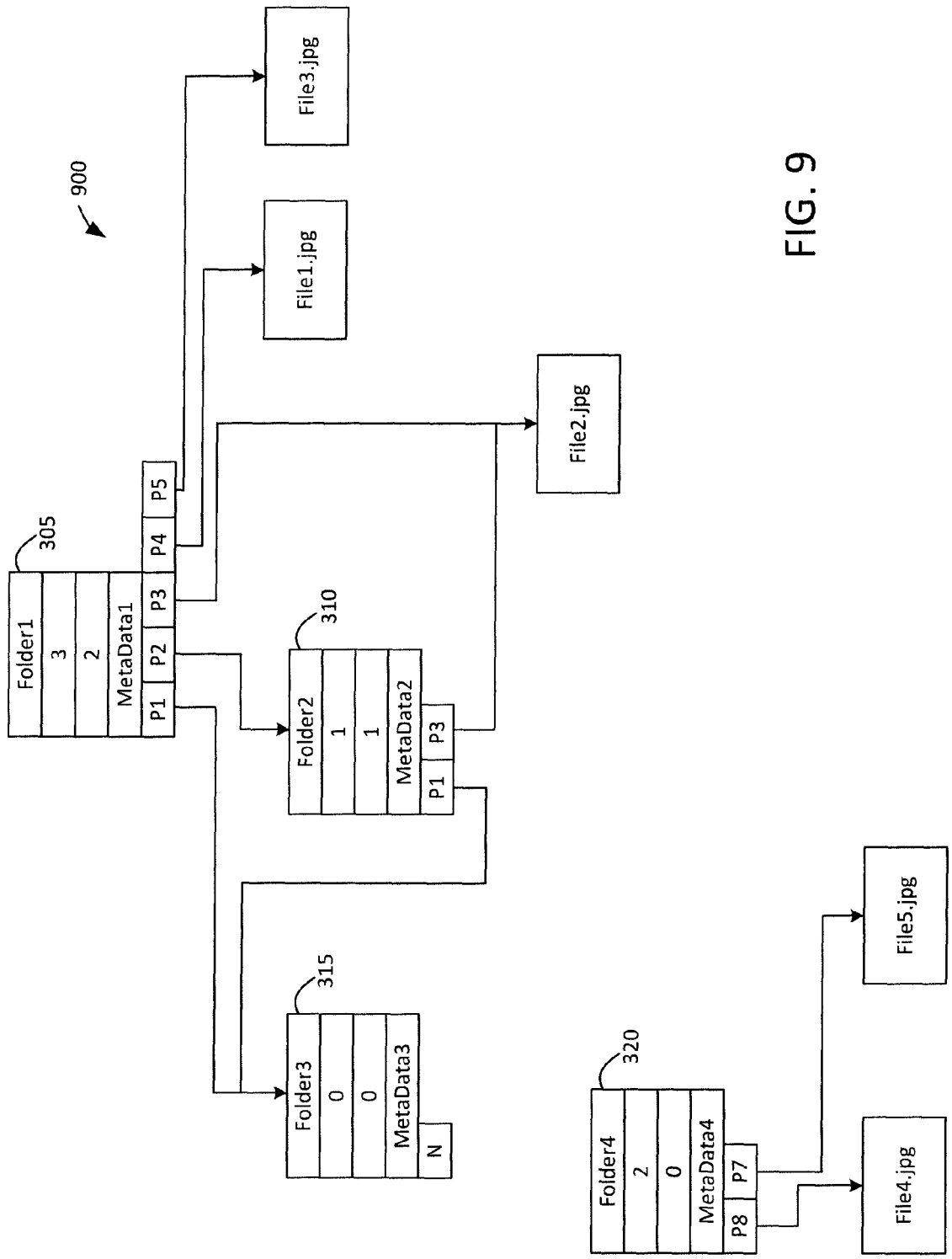
FIG. 9 shows a block diagram of an example file system organization including structures representing folders in accordance with an implementation.

The "Purge" operation is a special version of the "Unrefer" operation where all of the contents of a folder are dereferenced. For example, referring to FIG. 9, the result of purging folder Folder3 of file system 180-1 indicated in FIG. 2 is shown at 900. The directly contained items of folder Folder3 are dereferenced, resulting in folder Folder4 becoming unreferenced. The items which thus become unreferenced (for example folder Folder4) could be archived as described below. In other variations the purge operation can be applied to specific type of items such as files or folders only.

Continuing with the operations of file system 180, the "Archive" operation is the process whereby the classification of selected items is changed from active to archived. Accordingly, the selected items become exempt from at least some of the operations applicable to active items of the file system 180 but are preserved as archived items of the file system 180 for later access and restoration. It should be noted that some items may be implicitly archived as a result of performing other operations. For example, an item that is dereferenced as a result of deleting its containing folder could be archived implicitly if it becomes unreferenced by any other active and/or archived folders in the file system.

Archiving can be implemented using various mechanisms. In one implementation, archiving an item by dereferencing involves removing all references or pointers to that file from containing folders and marking it as archived, for example through an archived indicator maintained in its metadata. An archived indicator in metadata can indicate whether an item is archived or active. In some variations, the marking is optional. One difference between an "Unrefer" operation and an "Archive-by-dereferencing" operation is that when an "Unrefer" operation is applied to an item, the item is dereferenced from a particular folder. On the other hand, when an "Archive-by-dereferencing" operation is applied to an item, the item is dereferenced from all of the folders it is contained in and archived. For example, archiving by dereferencing the file File5.jpg of file system indicated at 300 shown in FIG. 3 would involve removing pointer P7 from the container structures for both folders Folder4 and Folder3.

Where the archived item is a folder, additional complexities may need to be addressed and thus several archiving rules may be used. According to a first archiving rule, only the folder selected is archived. All remaining items remain as they are. For example, archiving folder Folder3 from file system 180-1 of FIG. 2 using the first rule or archiving, would result in folder Folder3 being archived, as shown at 1000 in FIG. 10. To archive folder Folder3 in accordance with the first archiving rule, all pointers to folder Folder3 are removed and the folder Folder3 is marked as archived in the metadata, as indicated by the asterisk next to its name for illustrative purposes. In variations, any items that become unreferenced as a result of applying the "Archive" operation in accordance with the first archiving rule can also be archived.

Figure 10:
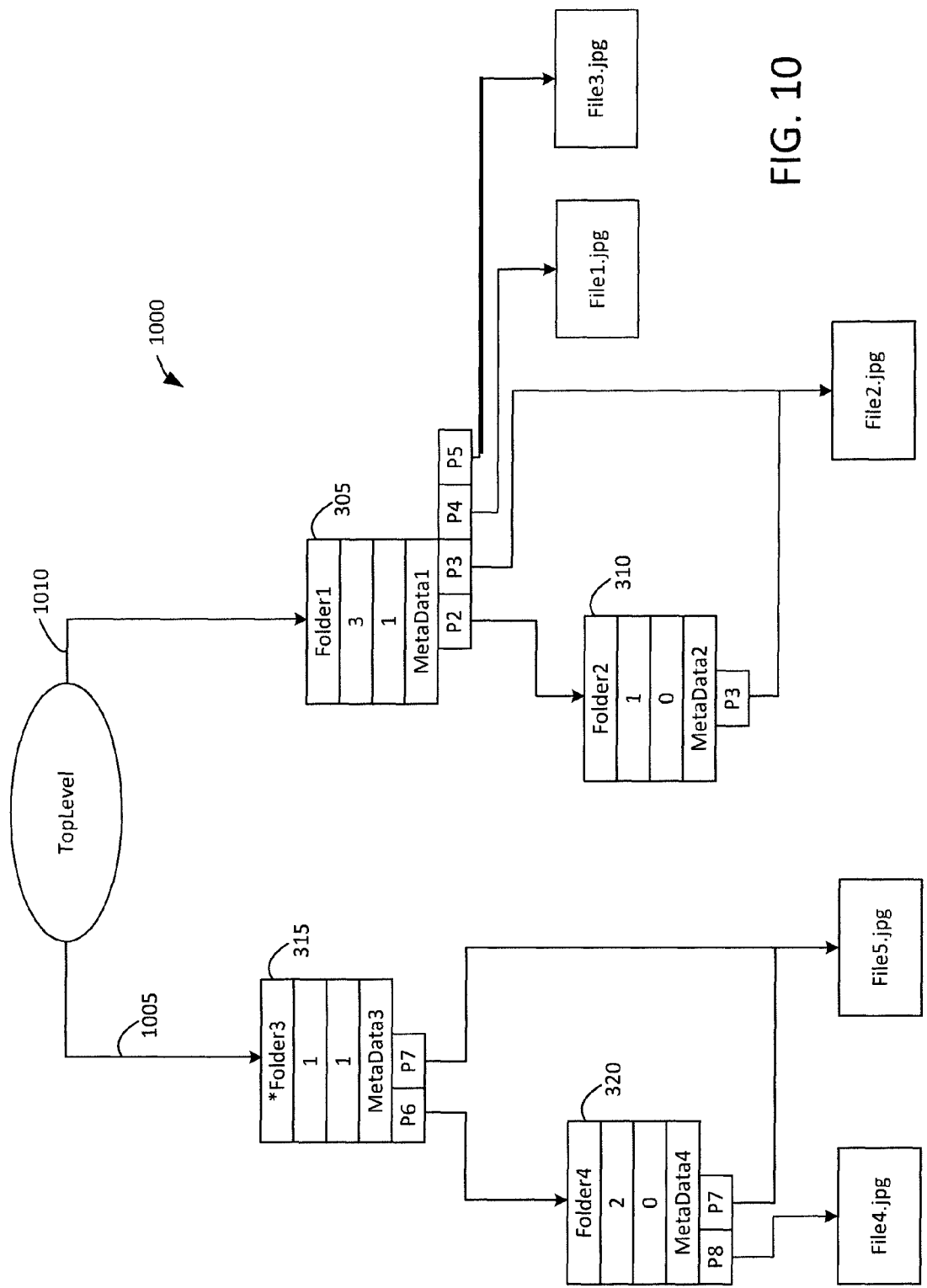
FIG. 10 shows a block diagram of an example file system organization including structures representing folders in accordance with an implementation.

One way of maintaining items archived by dereferencing is to maintain a top level folder TopLevel (as indicated in FIG. 10). The TopLevel folder could be the root folder in some implementations. At least one pointer from folder TopLevel, in this case pointer 1010, can be identified for pointing to or referencing active items only of the file system 180-1. Other pointers from folder TopLevel, such as pointer 1005, can be classified as pointing to or referencing archived items. In variations, the pointers would not be classified in any manner, but it would be assumed that items contained by the TopLevel folder are not referred to by a folder by convention. Accordingly, in these variations, being marked as archived would be relied upon to classify an item as an archived item.

In other implementations, a designated folder could be used to contain all the archived items (not shown) and the designated folder can be, as indicated above, the TopLevel folder or can be contained by the TopLevel folder or some other folder in the file system. Such designated folder or folders can be referenced by references identified as pointing to archived items (such as pointer 1005) and items contained by the designated folder(s) can reference their contained items through references identified as referencing archived items. In some variations, the TopLevel folder would be designated as the root folder for the file system.

Other methods of maintaining items archived by dereferencing will now occur to a person of skill and are contemplated. For example, in one variation, any item that is contained by a folder (other than a folder designated for containing archived items, such as the TopLevel folder through references identified as referencing archived items) may be considered to be an active item. Moreover, the containing folder can be an archived folder. As an example, an item that is referenced by references other than references identified as referencing archived items can be considered to be an active item. For example, as indicated in FIG. 10, application of the first archiving rule can leave some items such as folder Folder4 being referenced or contained by archived folders only (Folder3 in this example). However, folder Folder4 would still be classified as active item in file system 180-1 since it is indeed contained by a folder, albeit an archived one.

Figure 11:
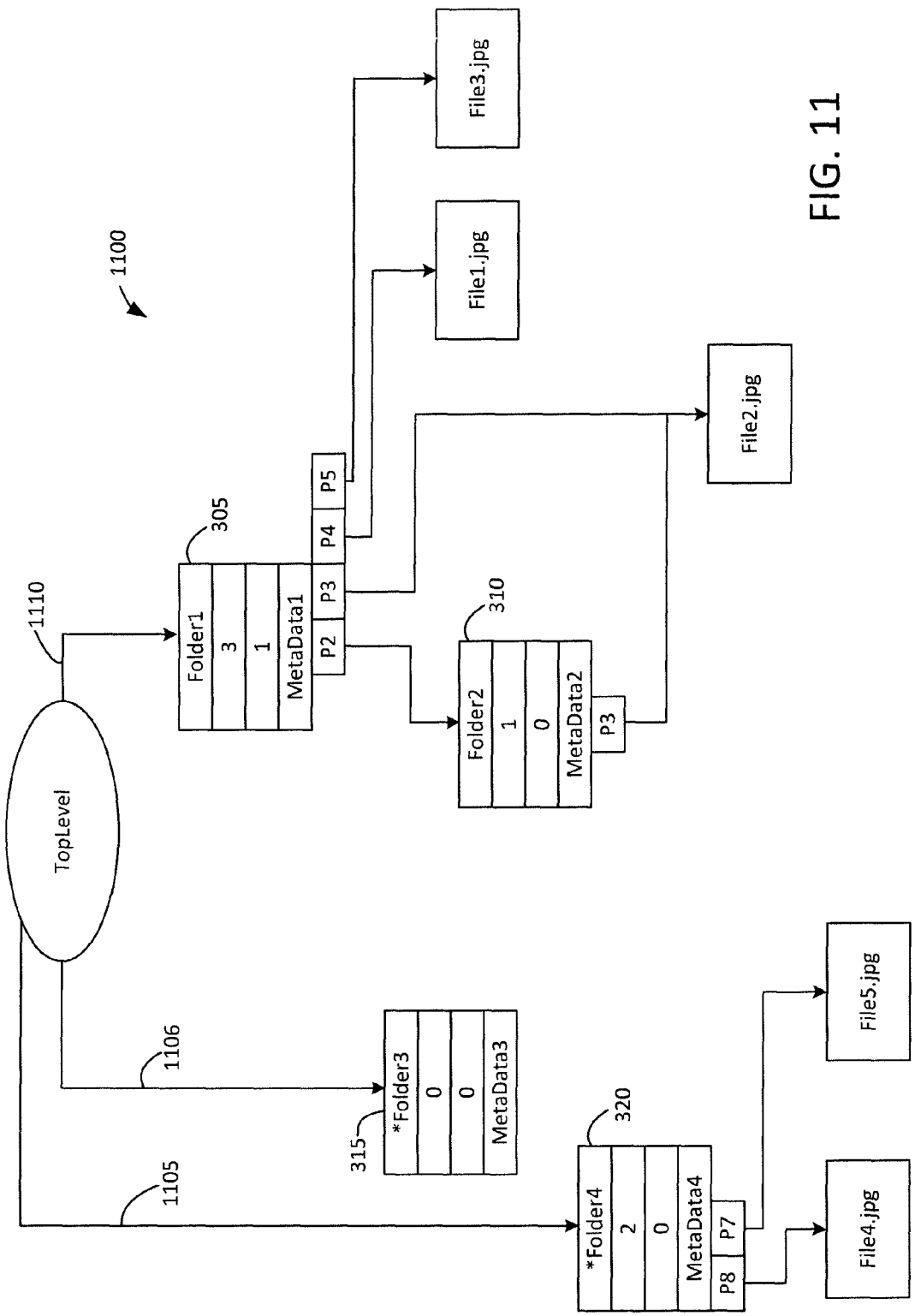
FIG. 11 shows a block diagram of an example file system organization including structures representing folders in accordance with an implementation.

In accordance with a second archiving rule, all items contained in the archived folder that are referenced only by archived folders can also be archived. For example, archiving folder Folder3 of file system 180-1 as shown in FIG. 2 based on the first archiving rule resulted in folder Folder4 and files File4.jpg and File5.jpg remaining as active items in file system 180, as indicated in FIG. 10. On the other hand, when folder Folder3 is archived based on the second archiving rule, folder Folder4 would be archived since it is contained only by the archived folder Folder3, as shown in FIG. 11 at 1100. In FIG. 11, archived items are referred to by pointers or references identified as referencing archived items, namely 1105 and 1106, and the active folder is referred to by the pointer 1110. Moreover, archived items are marked as archived as indicated by an asterisk next to their name for illustrative purposes. Accordingly, references from folder Folder3 to folder Folder4 and file File5.jpg would also be removed to effect archiving by dereferencing. However, it should be noted that file File4.jpg would not be archived since it is not directly contained by folder Folder3, and file File5.jpg would not be archived since it is referenced by Folder4, even though they are referenced only by an archived folder, Folder4. Accordingly, the references to file File4.jpg and file File5.jpg are not removed and the files remain classified as active items.

In variations, any items that become unreferenced as a result of applying the "Archive" operation in accordance with the second archiving rule can also be archived.

Figure 12:
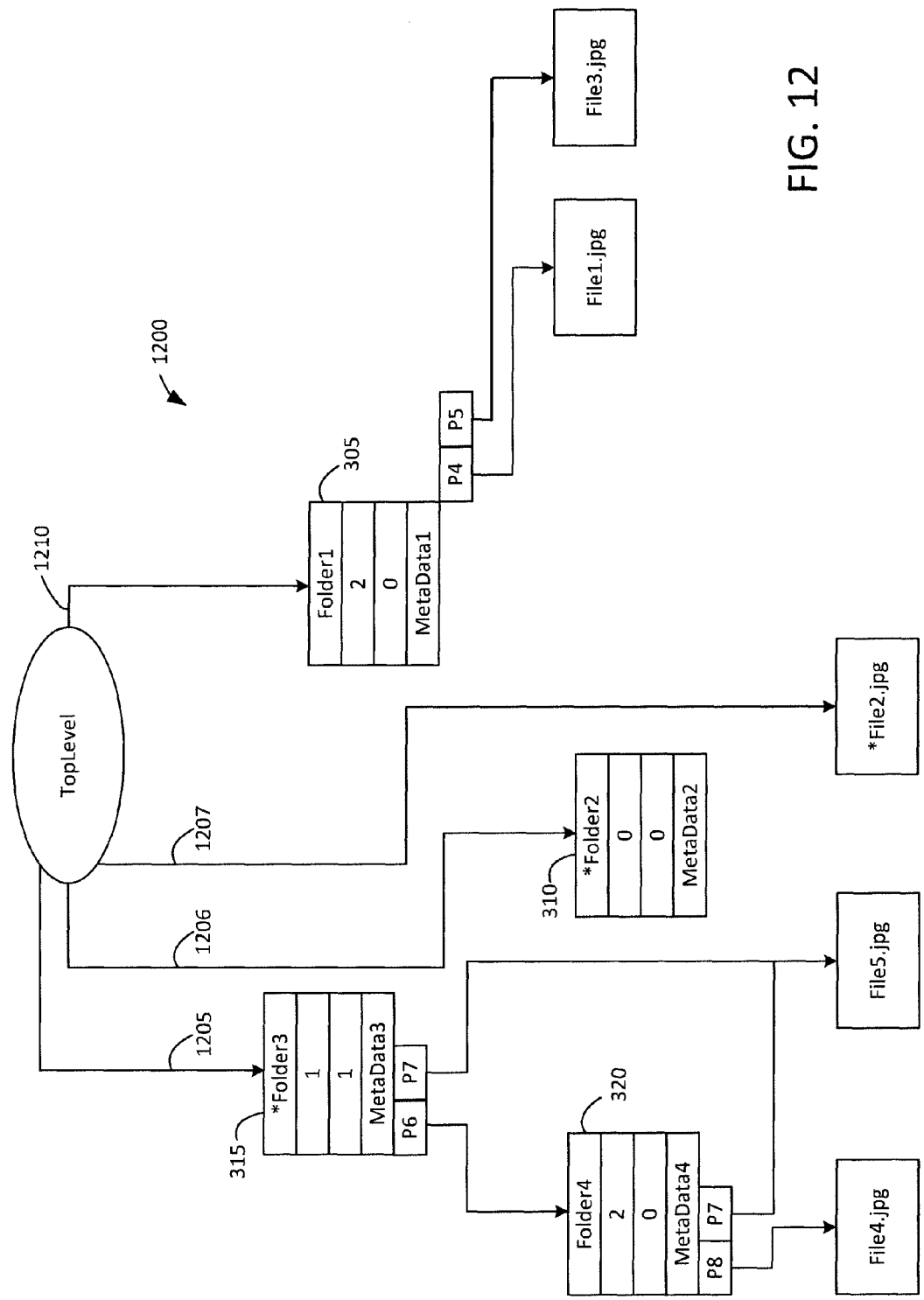
FIG. 12 shows a block diagram of an example file system organization including structures representing folders in accordance with an implementation.

In accordance with a third archiving rule, the folder selected, as well as all directly contained or referenced items, can be archived. Accordingly, file File2.jpg and folder Folder3 would also be archived when folder Folder2 of file system 180-1 as shown in FIG. 2 is archived in accordance with the third archiving rule. The result is shown in FIG. 12 at 1200 where archived items are referred to by pointers identified as referencing archived items, namely pointers 1205, 1206 and 1207 and marked as archived as indicated by an asterisk next to their name for illustrative purposes. Active folder Folder1 is referred to by the pointer 1210. As shown, to effect archiving by dereferencing in accordance with the third archiving rule, the references to file File2.jpg and folder Folder3 would be removed, as well as to folder Folder2 and these items would be referenced by references identified as referencing archived items.

In variations, the first, second and/or third archiving rules can be also applied to folders contained by the folder being archived. Moreover, this process can be repeated. For example, the first archiving rule can be applied to all folders reachable from the initially archived folder. Alternatively, a rule can be applied for a specified portion of the hierarchy, such as to a predetermined number or portion of folders contained (directly or indirectly) by the archived folder. As a further alternative, a rule can be applied to folders contained by the archived folder that are a predetermined number of levels below the archived folder in the hierarchy. Archiving folder Folder3 from the file system 180-1, in accordance with the second archiving rule as applied to all of the folders reachable through folder Folder3, for example, would result in the archiving of folders Folder3 and Folder 4 as well as files File4.jpg and File5.jpg, (as opposed to the results indicated in FIG. 11 which are obtained when the second archiving rule is applied only to the archived folder itself). In all of these archiving variations, container data structures would be updated as appropriate to reflect the changes to the file system. In further variations, different rules may be applied to different portions or levels of the hierarchy contained by a folder. Other variations of applying archiving rules to a folder and its contents will now occur to a person of skill and are contemplated. For example, in variations, only files or folders may be archived in accordance with the archiving rules.

Figure 13:
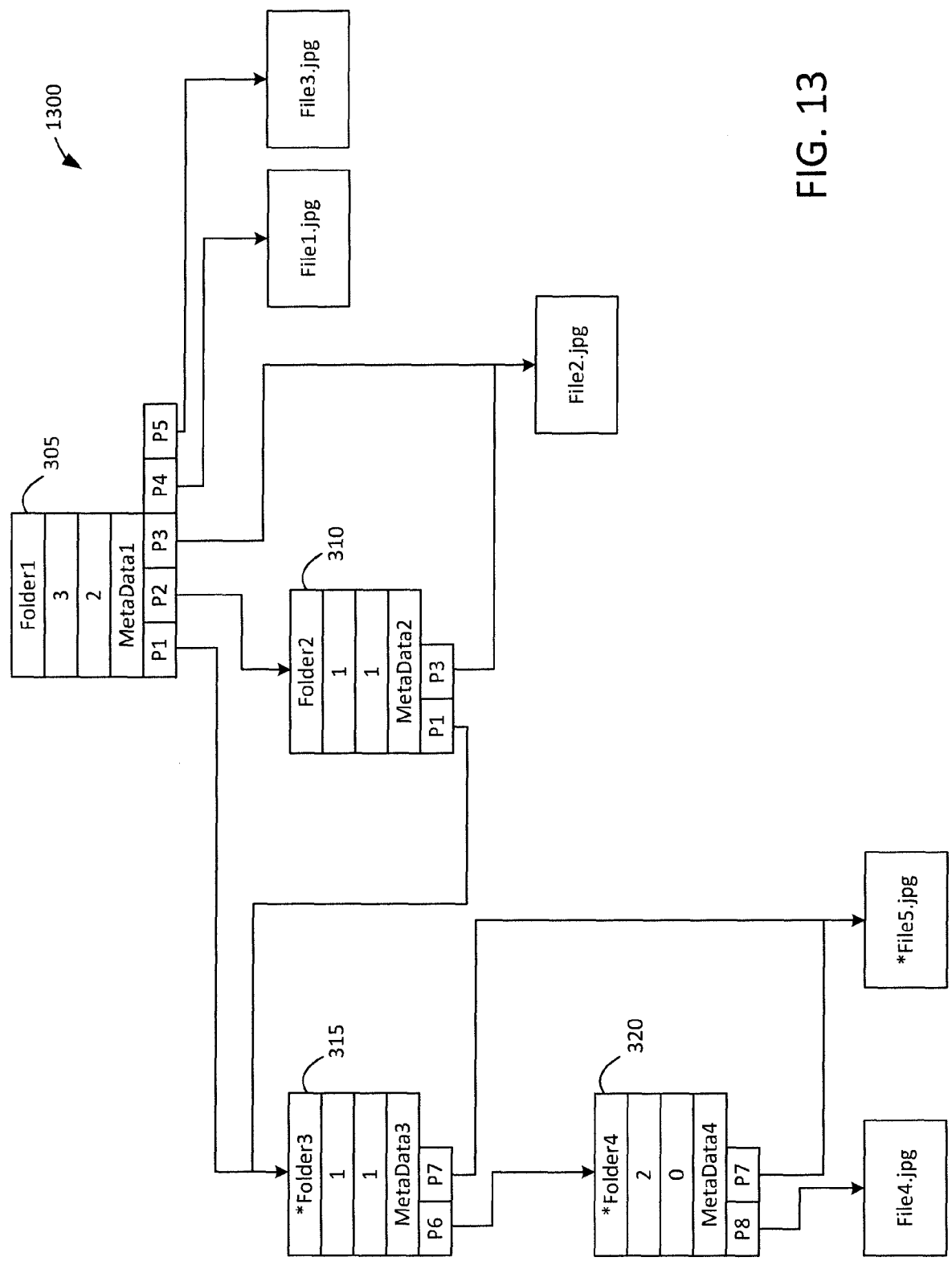
FIG. 13 shows a block diagram of an example file system organization including structures representing folders in accordance with an implementation.

In another implementation of archiving, archiving with references, when an item is archived, references to that item are not actually removed, but instead the item is marked as archived. FIG. 13 at 1300 shows the result of archiving with references folder Folder3 of file system 180-1 of FIG. 2 in accordance with the third archiving rule. The items marked as archived are indicated with an asterisk next to their name for illustrative purposes, even though the marking would typically be effected through manipulations of the metadata associated with the archived items. For example an archive indicator maintained by the metadata of an item can be changed to indicate that the item is archived. Other methods of marking items as archived will now occur to a person of skill and are contemplated.

Continuing with FIG. 13, items archived with references continue to be referenced by folders within file system 180-1. When the file system is traversed, however, to display contents or generate search results for active items, for example, any archived item can be omitted from the results collected or presented. The items archived with references would be presented when archived items are being sought. Thus, as far as any application or user accessing the file system is concerned, the archiving operation would appear to yield the same results as archiving by removing references (dereferencing). The advantage of archiving with references is that archived items or hierarchies of items can continue to be updated, where appropriate, in accordance with the operations on the active items of the file system. For example, referring to FIG. 13, when folder Folder2 is deleted, archived folder Folder3 is removed from the folder Folder2's container data structure, and thus is only contained by folder Folder1.

In variations, archiving by dereferencing or with references can be applied selectively to different portions of the file system. In order to be able to mix the two methods of archiving, all items archived are marked as archived, through for example the use of metadata, regardless of which method of archiving was used.

Another file system operation, "Restore", involves classifying archived items as active items and thus integrating archived items back into the file system. When restoring archived items, the type of archiving performed (with or without references) can determine the restoration methodology to be used. For example, where the archived item was archived by removing references to it, a location for the archived item (for example which folder or folders it should be contained by) can be chosen, and the archive mark, typically contained with the metadata, of the item modified to change the status of the item to unarchived or active, to complete the restoration of that item. Alternatively, where the references by the containing folders were not removed, the "Restore" operation may entail modifying the archive mark to unarchived or active without further input of folders, since the references to the item by containing folders were retained when the item was archived. This method of archiving has the advantage that restoring an item or items allows their restoration into the locations from which they were archived. Moreover, since the items archived with references can be updated based on file system operations, the restoration allows an item to be restored to its previous location even when the item's previous location has been updated, by for example moving it to other locations through "Refer" and "Unrefer" operations. In variations, both choosing a location and modifying the archiving indicator from the metadata may be used. If the item being restored is a folder containing other archived items, those items could also be restored at this point.

In some variations, file system operations may include mechanisms to enforce certain file system policies associated with the file system. For example, as described above, "Create" and "Refer" operations can be used to enforce a no file duplication policy. Other policies will now occur to a person of skill and are contemplated. For example, in some variations, two folders or two files with the same name may not be contained in the same folder.

In some variations of a file system, each item (file and/or folder) in the file system may also include location pointers to all folders within which the item is contained (contained-by pointers). In some implementations, this information can be maintained in the form of an additional array in the container data structure for example, and/or can be included in the metadata for the item (including files that are not folders). Other variations for maintaining contained-by information will now occur to a person of skill and are contemplated.

Figure 14:
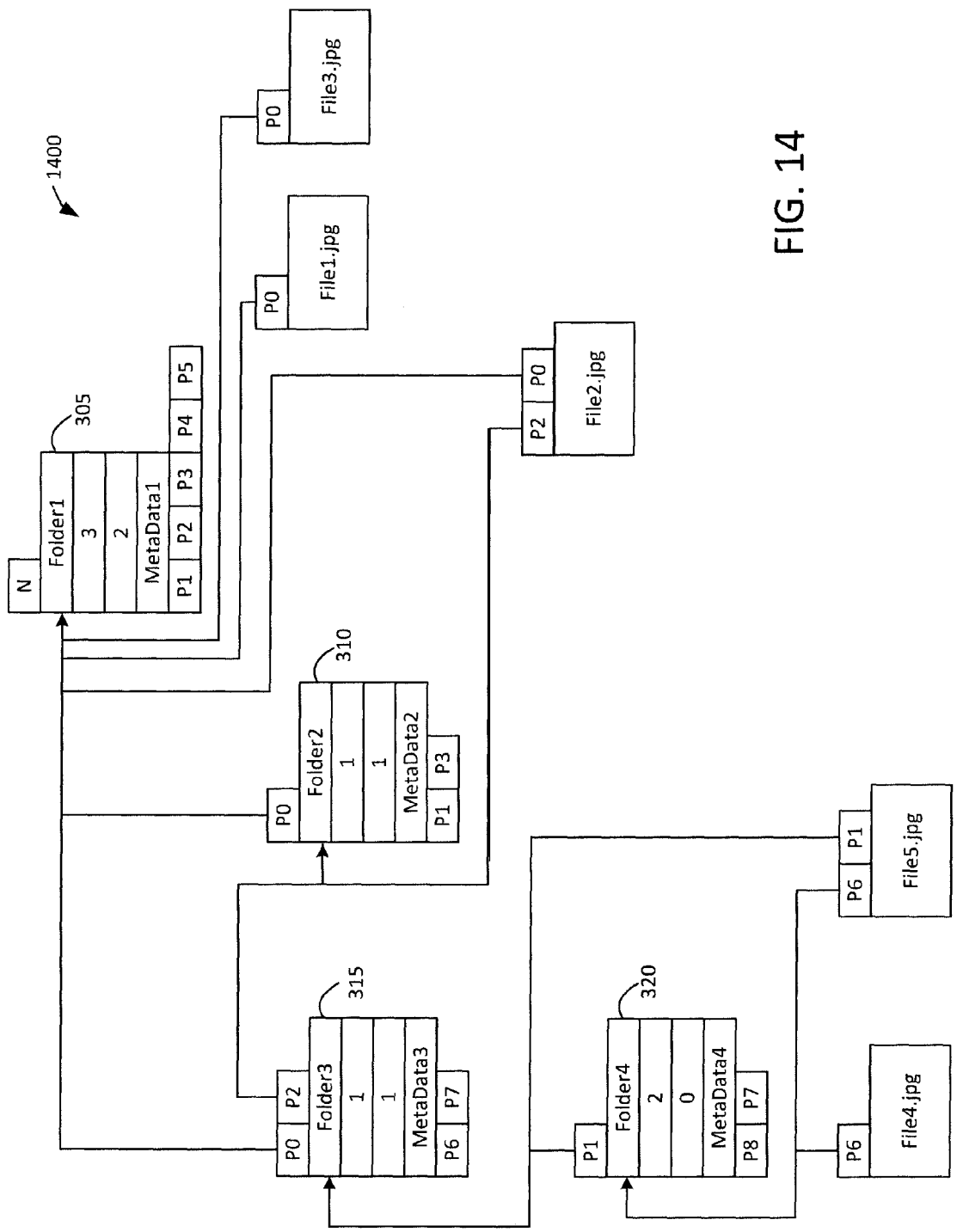
FIG. 14 shows a block diagram of an example file system organization including structures representing folders in accordance with an implementation.

Referring to FIG. 14, contained-by arrays of pointers are shown at 1400 for each item of file system 180-1 of FIG. 2. The arrows indicate the folders by which an item is contained. For example, file File2.jpg is contained by folder Folder1 (P0) and folder Folder2 (P2), whereas folder Folder4 is contained by folder Folder3 (P1). Contained-by constructs allow quick and efficient search of the file system. Moreover, contained-by constructs allow efficient realization of an item's context. For example, contained by pointers can be used to quickly provide a context for an item (which folders contain the item, for example).

Contained-by arrays may be updated in light of operations performed through the file system services. For example, when an item is created, a null contained-by array is included to reflect that it is not referenced by a folder in the file system. When an item is newly referenced by a folder, a pointer to that folder is added to its contained-by array. Similarly, when an item is dereferenced from a folder, the pointer to that folder is removed from its contained-by array. Along the same lines, when an item is archived, its contained-by array can be emptied. Alternatively, the archived item's contained-by array may be retained, thus allowing the item to be restored to its previous location or locations, as indicated by its contained-by array. Accordingly, when the item is restored, it can be referenced into the folders pointed to by the contained-by array of the item being restored. In these variations, the contained-by array may be updated when relevant changes occur to the file system. These variations to archiving and restoring may be applicable whether an item is archived by dereferencing or archived with references.

Contained-by constructs may also allow enhanced functionality of at least some of the operations of the file system. For example, in the case of the "Refer" operation where an item is being referenced by a destination folder, contained-by arrays of other items in the destination folder may be used to locate other folders that contain those items contained by the destination folder. These other folders may then be provided as suggestions for alternative or additional folders within which the item being referenced may be also included. Moreover, file manager 150 can also suggest referencing other items contained in the referenced item's original folder to the destination folder. In one variation, the suggestions may be provided as part of a user interface. For example, in the case of the "Unrefer" operation where an item is being dereferenced from one or more folders which contain it, the contained-by array may be used to present a list of folders from which the item may be simultaneously removed. In another example, in the case of the "Restore" operation where an item which has been archived with references is being restored to one or more folders which contain it, the contained-by array may be used to present a list of folders into which the item may be simultaneously restored.

Files and folders in the file system 180 may be organized using various other relationships besides contains and contained-by relationships. Similar to the contains and contained-by arrays, each item may maintain one reference structure, or two reference structures (paired reference structures) such as two arrays of references, or more reference structures that indicate the relationships between items in a file system. It should be noted that in some of these variations, files may be organized hierarchically in a graph, without the use of folders.

As an example, consider organizing the file system based on a content derivation relationship. Accordingly, a first file may be related to a second file if the contents of the second file are derived from the first file. In this case the first file can be referred to as the parent file (derived-from), and the second file may be referred to as the child file (derived-by). The derivation may be in the form of editing the content of a file. For example, if the first file is a picture, a second file may be derived from a first file by cropping that picture. Alternatively, the derivation may be in the form of combining content. For example, if the first and second files are side-by-side pictures of a landscape, a third file may be derived from the first and second files by combining the two to generate a panoramic view picture of the landscape as the third file. Accordingly, a parent may have many children or a child may have many parents, or both.

Figure 15:
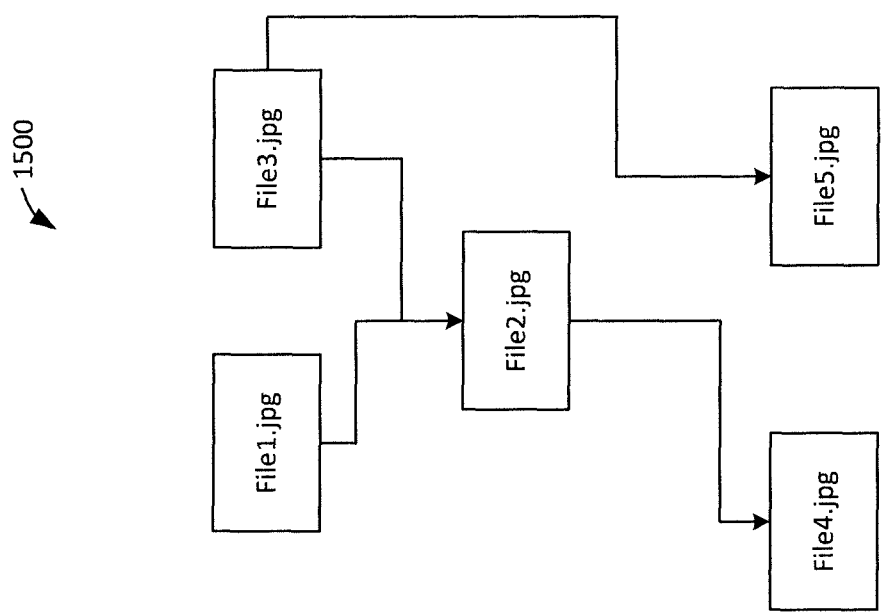
FIG. 15 shows a block diagram of an example file system organization based on file relationships in accordance with an implementation.
Figure 16:
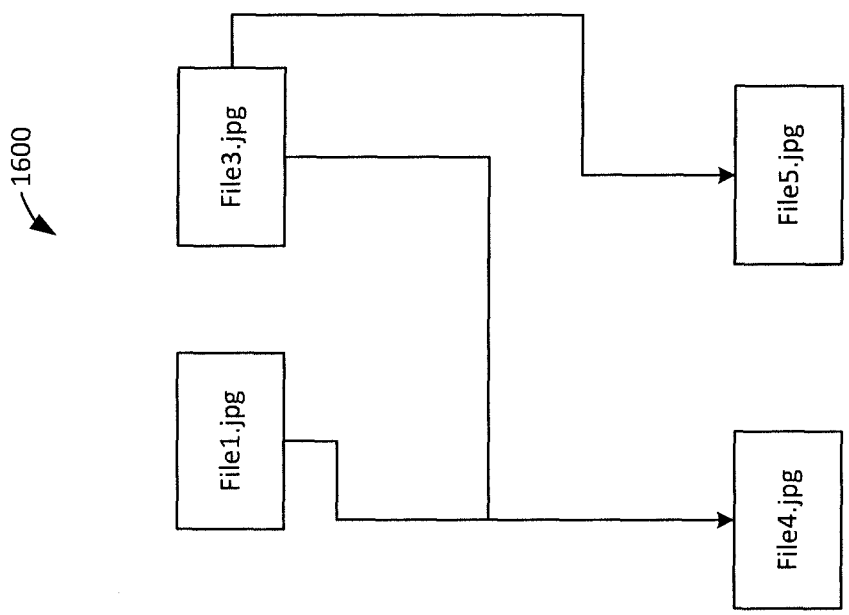
FIG. 16 shows a block diagram of an example file system organization based on file relationships in accordance with an implementation.

Referring to FIG. 15, content derivation relationships for file system 180-1 of FIG. 2 are shown at 1500. Accordingly, files File1.jpg and File3.jpg are parents of file File2.jpg. In turn, file File2.jpg is the parent of file File4.jpg. Finally, file File3.jpg is the parent of file File5.jpg. Content derivation relationships can be updated based on file system operations. For example, deleting file File2.jpg would result in file File4.jpg becoming the direct child of files File1.jpg and File3.jpg, as shown in FIG. 16 at 1600.

Appropriate data structures may be added to the files to allow the representation and maintenance of content derivation relationships. In this example, each file can include one and/or two arrays. One array would contain references or pointers to those files that are its children. The second array would contain references or pointers to those files that are its parents. Content derivation relationships can be created by an application, for example when saving a new file formed from combining two other files. Other relationships will now occur to a person of skill in the art which can be maintained through the use of one or more reference structures. For example, arbitrary relationships can be created based on user-defined relationships. Accordingly, each user may specify the relationships between items, arbitrarily, without being based on content derivation, for example. In variations, each file system may be organized in accordance with one, two or more relationships at a time.

The file manager application 150 of FIG. 1 may include a user interface module for providing folder organization visually and for receiving input from users through the input devices of computing device 104. Moreover, the operations and data structures used for the file system may aid these user interfaces. For example, graphical user interfaces may be provided to indicate active and archived items in the file system. In one implementation, the user interface can present all of the folders that directly contain a selected item, as identified for example on the basis of the item's contained-by array. In variations indirect containers of an item can also be provided. For example, for file File5 of file system 180-1 as depicted in FIG. 2, folders Folder4 , Folder3 , Folder2, and Folder1 may all be provided. In variations, as in the example just discussed, the indirect containers may be traced back to the root folder. Moreover, the folders may be listed individually, or alternatively, a folder path may be specified for each folder. For example the folder path for folder Folder3 may be Folder3 -Folder4 . Accordingly, a portion of the file system hierarchy is selectively presented in accordance with a context of the selected item. In some variations, contents of the folders presented as direct and/or indirect containers of the selected item may also be presented. The presented context can be traversed by selecting, from the presented items, a new item, which would thus cause the context presented to be updated as appropriate for the selected item. Thus, the context-based presentation of the file system allows the visualization of potentially related items.

Similarly, a user interface may provide, on the basis of contained-by arrays, one or more containers containing the item when an item is to be, for example, unreferred. Moreover, the potential restore locations can be provided for an item to be restored based, for example, on contained-by arrays. The interfaces may also allow selection or deselection of one or more options, such as references or folders. This could allow controlling which of the folders or containers of the selected item are operated on. For example, based on this interface, an item can be removed from more than one folder through the same interface. In variations, multiple paths to an item can be presented and the selections can be based on paths.

The user interface may also be used to provide all versions of a file or a subset of the content relationships for a file, based on other relationship structures such as the content derivation relationship structure.

In variations, the list of items contained in a folder may also be organized in a manner to reflect file and folder order to be presented in the user interface. Accordingly, the items in the list may be organized in a predetermined manner to reflect a preferred order of files and folders as specified, for example, by a user, such that the item to be presented first, when the folder content is being viewed as a list, appears first in the list of items contained, and items to be presented later appear later in the list of items, in accordance with the provided ordering. The ordering may be based on folder properties, as specified in the metadata. For example, metadata may indicate that when the folder contents are to be viewed, files are to be presented first, followed by folders. The ordering of pointers in the list of items contained can reflect this preference. In some implementations multiple lists can be included. Moreover, similar methods can be applied to contained-by arrays and the display of folders containing an item.

In some variations, contents of, or items contained in, a folder may be populated in accordance with a "Populate" operation based on one or more folders. For example, contents of a recipient folder, Folder8, may be determined on the basis of the contents of two other folders, Folder9 and Folder10 which are the contributor folders. One or more operators may be used to create population selection operations on the basis of which content from the contributor folders can be selected. For example, contents of the contributor folders may be combined using union, intersection or exclusive union operators. Where the union operator is used, the contents found in either contributor folder would be combined to populate the contents of the recipient folder. Where the intersection operator is used, contents common in both contributor folders are used to populate the recipient folder. And where the exclusive union operator is used, all content found in one contributor folder or the other contributor folder is used, but those items found in both contributor folders is excluded. Although two contributor folders are used as an example, in variations one or more contributor folders can be used. The content contributed can be directly and/or indirectly contained contents of the contributor folders. In the case of indirectly contained content, the content structure can be flattened prior to inclusion the recipient folder. In further variations, the operators can be used in various combinations. Moreover, other operators than the three described are possible and contemplated. For example, a unary operator "not" can be used to indicate that a contributor folder or folder's contents should be excluded.

To implement folder population, one or more reference structures, similar to contains and contained-by arrays can be used. In one variation each contributor folder can maintain a recipient structure indicating the recipient folders to which a folder contributes, in this example a list of pointers or references to recipient folders. The recipient structure can be part of the metadata for a folder or part of the folder's container structure. Thus, in this example, the recipient structure for folders Folder9 and Folder10 would include a pointer to folder Folder8. Whenever the contents of any of the contributor folders, such as folder Folder9, change, the recipient folder's, in this case folder Folder8, content is re-determined, as indicated by the recipient structure. This re-determination, for example, can be done as part of the operation that updates a contributor folder's content. In some variations, the list of items contained for the recipient folder may be updated based on the determination. In other variations, the determination may be made each time a recipient folder's contents need to be accessed, for example for display purposes. In some implementations, the recipient folder may have content in addition to the content populated on the basis of the contributor folders. In further variations, each folder may include an additional contributor structure, indicating the folders from which a recipient folder received content.

In some variations, population selection operations can be updated when the contents of one or more of the contributor folders are updated. For example, when a contributor folder is deleted, it can be removed from the population selection operation. In some variations, the removal may need to be verified in order to prevent the formula becoming invalid. In other variations, when a contributor folder is archived, the archived folder can remain in the population selection operation. Performing an "Refer" or "Unrefer" operation involving a contributor folder may cause the performance of population selection operations including that folder to be triggered, the operation being reapplied at some point after the operators are applied to the contributor folder. In some variations, after an "Archive" operation is applied to a recipient folder the recipient folder may continue to be updated. Accordingly, when the archived recipient folder is restored, its contents can be restored as well. In other variations, when a recipient folder is archived, the population selection operation associated with the folder may also be archived. When the archived recipient folder is restored, it can be repopulated in accordance with the population selection operation associated with the restored folder. It should be noted that in these cases, the population selection operation associated with an archived folder may continue to be updated as the contributor folders are updated, for example by a "Delete" operation.

Metadata for files and folders may include various information. For example, it may include information such as creation and editing times and dates. It may also include other items such as file sizes, file size in memory 112, as well as information regarding whether an item is active or archived. It may also include contained-by arrays, and/or content-relationship structures. Metadata can also include information and structures that allow options selected for each file or folder to be maintained. Some such structures, an ordered list of items and related data so as to provide a selected display order for the contained items of a folder, have already been discussed. Others will now occur to a person of skill and are contemplated.

In the above provided illustrative example shown in FIG. 1, file manager 150 utilizes the file system services provided by operating system 170 to organize and maintain files and folders in memory 112. In other implementations, a file manager application may be configured to implement a file system in accordance with a file system protocol that is different from the file system protocol supported by the operating system 170. For example, operating system 170 may provide file system services that allow maintaining a file system in accordance with the file system protocols such as new technology file system (NTFS). In contrast, the file manager application can maintain a file system in accordance with different file system protocols, such as those described above.

Figure 17:
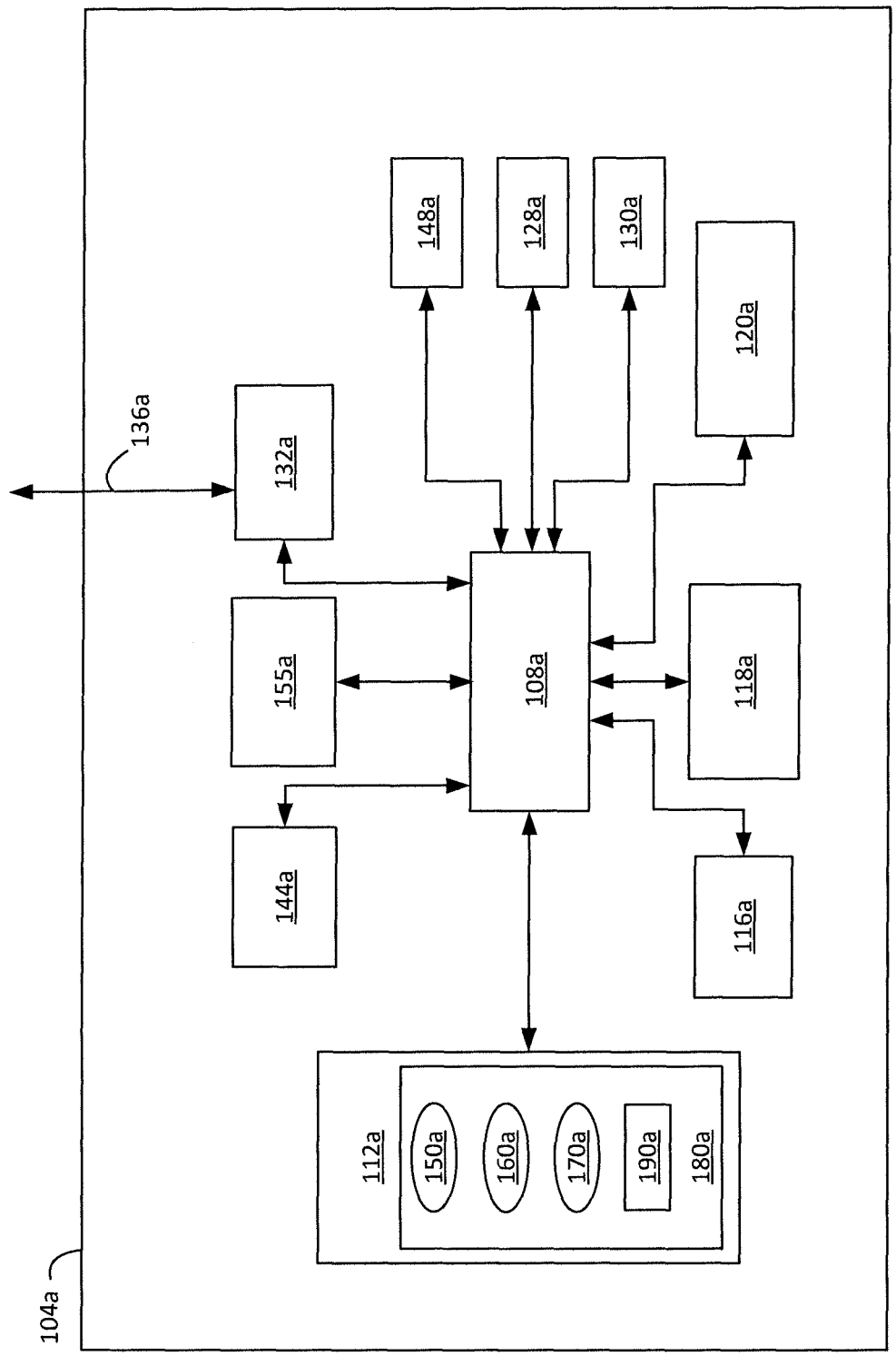
FIG. 17 shows a block diagram of functional subsystems of an example computing device in accordance with an implementation.

Referring now to FIG. 17, a device 104a is shown in accordance with another implementation. In FIG. 17, Device 104a is a variation on device 104 and thus like references bear like elements except followed by the suffix "a". Moreover, in memory 112a, a file system 190a is maintained in accordance with a file system protocol that is different from the file system protocol supported by the file system 180a of operating system 170a.

In this example implementation, file manager application 150a maintains a file system 190a inside file system 180a, and is used to organize at least a portion of the files and folders maintained by file system 180a, in accordance with a file system protocol that is potentially different from the one used by file system 180a. Accordingly, the file manager application 150a utilizes the file system services in the form of application programming interfaces (APIs) provided by the operating system 170a to access the files and folders maintained in memory 112a. However, file manager 150a uses its own file system operations to organize the file system it maintains. For example, if file manager 150a operates as a Windows® operating system application, file manager 150a may organize a number of files in accordance with the operations and policies described herein, but would ultimately call the file system services provided by Windows® to store the files in memory 112a. Accordingly, the files of file system 190a would be organized both in accordance with the file system 190a and the file system 180a.

The file manager application 150a may utilize certain mechanisms to impose policies in file system 190a, such as a no duplicate files policy, that may not be imposed by the operating file system 180a. Moreover, the hierarchy of the files maintained in 190a may be different from their organization in file system 180a. For example, one folder maintained by file system 180a may be used to store all the files and folders maintained by file system 190a. In addition, file names used by the file system 190a may be different from the file names used by file system 180a, and this difference may be imposed in a systematic manner. For example, where the same name refers to multiple files of system 190a, the same file name cannot appear twice in the one folder of file system 180a used to contain the files and folders managed by file manager 150a. Accordingly, a character such as "#" can be reserved as a disallowable character for use in file names of file system 190a. The names used by the file system 180a may then be appended by a number—indicating the instance of the file—and the disallowed character to distinguish the files which have the same name. As an example, according to this method, the first instance of a file with the file name File.jpg in the file system 190a would also get the name File.jpg in the file system 180a. However, the second instance of a file with the file name File.jpg in file system 190a would get the name File#1.jpg in the file system 180a.

In some implementations, the container data structures of file system 190a may utilize data items to facilitate interaction with the file system 180a. For example, the file names used by the file system 180a may be different from the file names used by the file system 190a. Accordingly, container data structures of file system 190a may also include the file names used by the file system 180a to allow coordination between the two file systems. Additional variations to data structures to allow coordination between the two file systems will now occur to a person of skill and are contemplated. For example, in some implementations of a file manager 150a a file location data structure may be used. To put the file location structure into use, the container data structures could include pointers to the file location structure, as opposed to the file system. Accordingly, the file location structure can operate as a name and location translator between file system 190a and file system 180a.

In other variations where the file manager 150a implements an alternative file system to the one maintained by the operating system, container data structures can use pointers in different forms to access the files as they are maintained by the operating system. For example, a directory path combined with an operating system file name can be used in place of a pointer. Alternatively, handles to files, as obtained from the operating system file system service API calls can be used. Other forms of pointing to the files will now occur to a person of skill and are contemplated. In some implementations, file manager application 150 or 150*a* can be used to view and organize files and folders associated with one or more applications, such as the picture manager application 160 or 160*a*. In these implementations, file manager 150 or 150*a* can expose APIs that allow other applications, such as the picture manager 160 or 160*a* to perform various operations defined above. Accordingly picture manager 160, for example, can access file manager 150 or 150*a* to perform file operations.

Referring now to FIG. 18 a method of maintaining a file system in a computing device is indicated at 1800. In order to assist in the explanation of the method, it will be assumed that method 1800 is operated using one of devices 104 or 104*a* as shown in FIG. 1 and FIG. 17 respectively. Additionally, the following discussion of method 1800 leads to further understanding of devices 104*a* and 104. However, it is to be understood that devices 104 and 104*a*, and method 1800 can be varied, and need not work exactly as discussed herein in conjunction with each other, and that such variations are within scope.

At block 1810, an item selection is received from the file system. The selection of the item may be assisted through the use of user interfaces as described herein. For some operations, the item selection is optional. At block 1820, an operation is applied. The operation can be any one of the operations described herein. The application of the operation may be assisted through the use of an interface that assists selection of references, folders or other options that can assist the application of the operation. The application of the operation typically involves modifying data of the file system such as the container data structures, metadata and others that will now occur to a person of skill. At block 1830, the results of applying the operation of block 1820 are presented through an interface.

It is to be emphasized, however, that method 1800 need not be performed in the exact sequence as shown, unless otherwise indicated, and likewise various blocks may be performed in parallel rather than in sequence. Hence the elements of method 1800 are referred to herein as "blocks" rather than "steps".

The above-described embodiments are intended to be examples and alterations and modifications may be effected thereto, by those of skill in the art, without departing from the scope which is defined solely by the claims appended hereto. For example, methods, systems and embodiments discussed can be varied and combined, in full or in part.

We claim:

1. A method of maintaining a file system on a computing device having a memory and a processor, the method comprising:
   maintaining in the memory a plurality of items including a plurality of files having unique content and a plurality of folders, each folder represented by a container structure, each container structure including references indicating items contained by the referencing container structure, at least one item being referenced by more than one container structure; and
   performing an operation on the file system,
   wherein the operation is "Refer" for referencing a selected item, selected from one of the plurality of items, by a destination folder selected from one of the plurality of folders and wherein the performing further comprises:
      adding, to a destination container structure representing the destination folder, a reference to the selected item, wherein each item of the plurality of items includes a contained-by structure and wherein the destination container structure includes references to contained items other than the selected item, the method further comprising:
      identifying additional folders, other than the destination folder, referencing the contained items; and
      providing the additional folders as further folders to add the selected item by applying the "Refer" operation.

2. A method of maintaining a file system on a computing device having a memory and a processor, the method comprising:
   maintaining in the memory a plurality of items including a plurality of files having unique content and a plurality of folders, each folder represented by a container structure, each container structure including references indicating items contained by the referencing container structure, at least one item being referenced by more than one container structure; and
   performing an operation on the file system,
   wherein the operation is "Delete" for deleting a selected item selected from one of the plurality of items and wherein the performing further comprises one of:
      deleting the selected item by:
         removing, from the plurality of container structures, any references to the selected item; and
         removing the selected item from the file system; and
      when the selected item is a folder optionally applying one of:
         when items are left unreferenced by any container structure in the file system as a result of deleting the selected folder, removing the unreferenced items from the file system; and
         performing, on all items referenced by the container structure corresponding to the selected folder, the "Delete" operation.

3. The method of claim 2 further comprising:
   when the selected item is a folder, applying the "Delete" operation to items indirectly contained by the selected item.

4. A method of maintaining a file system on a computing device having a memory and a processor, the method comprising:
   maintaining in the memory a plurality of items including a plurality of files having unique content and a plurality of folders, each folder represented by a container structure, each container structure including references indicating items contained by the referencing container structure, at least one item being referenced by more than one container structure; and
   performing an operation on the file system,
   wherein the plurality of items include archived items and active items, wherein the operation is "Archive" for archiving a selected one of the plurality of active items and wherein the performing further comprises:
      classifying the selected active item as an archived item; and
      when the selected active item is a folder optionally applying one of:
         classifying as archived, all items becoming unreferenced by an active folder as a result of archiving the selected active item; and classifying as archived, all items directly referenced by the selected folder.

5. The method of claim 4 further comprising:
when the selected item is a folder, applying the "Archive" operation to items indirectly contained by the selected active item.

6. The method of claim 4 wherein classifying as archived comprises at least one of:
indicating the selected active item as archived in metadata associated with the item; and
removing all references to the selected active item.

7. A method of maintaining a file system on a computing device having a memory and a processor, the method comprising:
maintaining in the memory a plurality of items including a plurality of files having unique content and a plurality of folders, each folder represented by a container structure, each container structure including references indicating items contained by the referencing container structure, at least one item being referenced by more than one container structure; and
performing an operation on the file system,
wherein the plurality of items include archived items and active items, wherein the operation is "Restore" for restoring a selected one of the plurality of archived items, wherein the selected archived item includes a contained-by structure and wherein the performing further comprises:
restoring the selected archived item as an active item by adding references to the selected archived item based on the contained-by structure of the selected archived item.

8. A method of maintaining a file system on a computing device having a memory and a processor, the method comprising:
maintaining in the memory a plurality of items including a plurality of files having unique content and a plurality of folders, each folder represented by a container structure, each container structure including references indicating items contained by the referencing container structure, at least one item being referenced by more than one container structure; and
performing an operation on the file system,
wherein the operation is provision of a context based view of the file system and wherein the performing further comprises:
receiving an indication of a selected item from the plurality of items; and
selectively presenting a portion of the file system in accordance with a context of the selected item wherein the context comprises at least one of:
each of the plurality of folders directly containing the selected item, as identified on the basis of the selected item's contained-by array; and
each of the plurality of folders indirectly containing the selected item, as identified on the basis of the selected item's contained-by array.

9. A method of maintaining a file system on a computing device having a memory and a processor, the method comprising:
maintaining in the memory a plurality of items including a plurality of files having unique content and a plurality of folders, each folder represented by a container structure, each container structure including references indicating items contained by the referencing container structure, at least one item being referenced by more than one container structure; and
performing an operation on the file system,
wherein each of the plurality of files includes derivation files, each derivation file having a content derivation structure having derivation relationship references to other derivation files based on a derived-by and derived-from relationship and wherein the operation is "Delete" for deleting a selected derivation file selected from one of the plurality of derivation files and wherein the performing further comprises:
deleting the selected derivation file from the file system; and
when the selected derivation file is both referenced-by derivation files and references referenced derivation files, linking the references to form derived-by and derived-from relationships with the referenced-by and referenced derivation files.

10. A method of maintaining a file system on a computing device having a memory and a processor, the method comprising:
maintaining in the memory a plurality of items including a plurality of files having unique content and a plurality of folders, each folder represented by a container structure, each container structure including references indicating items contained by the referencing container structure, at least one item being referenced by more than one container structure; and
performing an operation on the file system,
wherein the operation is "Populate" for determining the contents of a selected folder selected from one of the plurality of folders and wherein the performing further comprises:
determining the content of the selected folder based on a formula combining one or more of the plurality of items.

11. The method of claim 10 wherein the performing is carried out in response to content changes in the one or more of the plurality of items.

\* \* \* \* \*